(12) United States Patent
Waydick et al.

(10) Patent No.: US 12,449,466 B2
(45) Date of Patent: Oct. 21, 2025

(54) METHOD AND SYSTEM FOR DISTRIBUTED GROUND DETECTION

(71) Applicant: DRS Naval Power Systems, Inc., Milwaukee, WI (US)

(72) Inventors: Eric M. Waydick, Saint Francis, WI (US); Timothy Carlson, Fox Point, WI (US)

(73) Assignee: DRS Naval Power Systems, Inc., Menomonee Falls, WI (US)

( * ) Notice: Subject to any disclaimer, the term of this patent is extended or adjusted under 35 U.S.C. 154(b) by 232 days.

(21) Appl. No.: 18/298,981

(22) Filed: Apr. 11, 2023

(65) Prior Publication Data

US 2023/0333154 A1 Oct. 19, 2023

Related U.S. Application Data

(60) Provisional application No. 63/331,553, filed on Apr. 15, 2022.

(51) Int. Cl.
*G01R 31/08* (2020.01)
*G01R 31/52* (2020.01)
*H02H 3/16* (2006.01)

(52) U.S. Cl.
CPC ........... *G01R 31/086* (2013.01); *G01R 31/52* (2020.01); *H02H 3/16* (2013.01)

(58) Field of Classification Search
CPC .... G01R 31/086; G01R 31/52; G01R 31/085; G01R 19/16538; G01R 19/2513; G01R 31/12; G01R 31/54; H02H 3/16; H02H 1/0061; H02H 3/162

USPC .......................... 324/509, 500, 512
See application file for complete search history.

(56) References Cited

U.S. PATENT DOCUMENTS

| 1,863,583 | A | 6/1932 | Robert |
| 2,409,885 | A | 10/1946 | Emil et al. |
| 3,248,646 | A | 4/1966 | Brazee |
| 3,286,129 | A | 11/1966 | Claude |

(Continued)

OTHER PUBLICATIONS

Application No. PCT/US2023/018199, International Search Report and Written Opinion, Mailed On Sep. 5, 2023, 12 pages.

(Continued)

*Primary Examiner* — Giovanni Astacio-Oquendo
(74) *Attorney, Agent, or Firm* — Kilpatrick Townsend & Stockton LLP

(57) ABSTRACT

In some aspects, a ground detection system may measure a difference from a tie point of the ungrounded electrical system and a ground point to determine if a grounded condition exists. The ground detection system may measure a plurality of signals at a plurality of distributed overload protection devices. The ground detection system may compare the plurality of signals from each of the plurality of distributed overload protection devices to stored threshold values. The ground detection system may determine a location of the grounded condition based at least in part on the comparing the plurality of signals from each of the plurality of distributed overload protection devices to the stored threshold values. In various embodiments, the location can be based on a length and an impedance of electrical circuit wiring. The ground detection system may display the location of the grounded condition on a display. Numerous other aspects are described.

15 Claims, 18 Drawing Sheets

(56) References Cited

U.S. PATENT DOCUMENTS

| | | | |
|---|---|---|---|
| 7,978,089 B2 | | 7/2011 | Salgueiro et al. |
| 11,686,758 B2 | * | 6/2023 | Varga .................... H02H 3/16 |
| | | | 361/93.1 |
| 12,019,113 B2 | * | 6/2024 | Haynes ................. G01R 31/52 |
| 2003/0179526 A1 | | 9/2003 | Culler et al. |
| 2008/0036466 A1 | | 2/2008 | Raber |
| 2009/0256576 A1 | | 10/2009 | Weems et al. |
| 2012/0086458 A1 | | 4/2012 | Wei et al. |
| 2012/0112758 A1 | | 5/2012 | Weems et al. |
| 2017/0059641 A1 | * | 3/2017 | Loucks ............ H02J 13/00006 |
| 2021/0184449 A1 | * | 6/2021 | Raisigel ............... G01R 31/085 |
| 2021/0382104 A1 | * | 12/2021 | Becker .................. G01R 31/52 |
| 2024/0170944 A1 | * | 5/2024 | Kendzia, III ........... H02H 3/16 |

OTHER PUBLICATIONS

PCT/US2023/018199, "Invitation to Pay Additional Fees and, Where Applicable, Protest Fee", Jun. 22, 2023, 2 pages.
EP23788862.3, "Partial Supplementary European Search Report", Jun. 17, 2025, 16 pages.
Application No. EP23788862.3, Extended European Search Report, Mailed On Sep. 9, 2025, 12 pages.

* cited by examiner

METHOD AND SYSTEM FOR DISTRIBUTED GROUND DETECTION

CROSS-REFERENCES TO RELATED APPLICATIONS

This application claims priority to U.S. Provisional Patent Application Ser. No. 63/331,553, filed Apr. 15, 2022, entitled "Method and System for Distributed Ground Detection," which is herein incorporated by reference in its entirety and for all purposes.

BACKGROUND OF THE INVENTION

Ungrounded electrical systems can be used in shipboard systems and in locations subject to ground instability (e.g., cities like Los Angeles where there can be earthquakes and rifts in the ground). Worn or damaged wiring or equipment can generate a grounded condition. Grounded conditions can present safety issues to personnel and potential loss or damage to equipment. Ground detectors can be used to manually determine when a grounded condition exists so that the grounded condition can be isolated, removed from the circuit, and safely return the system to an ungrounded state. Presently, ground detection is performed primarily in a central location such as a load center. Detection and removal of a single ground before a second ground develops will prevent ground fault currents.

Pinpointing the location of a grounded condition can be a manual process in which technicians open and close circuit breakers to isolate sections of the electrical bus until the location of the grounded condition can be identified. Technicians can use fixed ground detectors to identify a grounded location by systematically examining individual buses by turning on and off electrical loads on the bus to isolate the grounded location to a load or isolate it to the main structure. Once the technicians have identified a probable location, visual inspections and insulation resistance checks can be required to identify the specific location, line, or equipment all while the systems are turned off. This can be a complex and time-consuming process that can result in a loss of critical systems during the isolation and repair process.

Therefore, there is a need in the art for improved methods and systems for performing distributed ground detection.

SUMMARY OF THE INVENTION

Some implementations herein relate to a method and a system for distributed ground detection. For example, an ungrounded power distribution system may include an electrical circuit that may include at least a first ground detector device and a second ground detector device. Each of the first ground detector device and the second ground detector device may include a voltage ground detection circuit configured to measure ground signal strengths. Ungrounded power distribution system may include a controller. The controller may include at least one processor configured to read a first signal strength at the first ground detector device and a second signal strength at the second ground detector device. The controller can be configured to determine a ground location based at least in part on the first signal strength at the first ground detector device and the second signal strength at the second ground detector device. The system may also include a communication network connecting the first ground detector device and the second ground detector device with the controller. The system may include a display configured to present the ground location in the ungrounded power distribution system. Other embodiments of this aspect can include corresponding computer systems, apparatus, and computer programs recorded on one or more computer storage devices, each configured to perform the actions of the methods.

The described implementations may also include one or more of the following features. The power distribution system may include a switch to transition the voltage ground detection circuit from a voltage detection mode to a ground detection mode. The switch can be configured to activate a plurality of relays that change a delta configuration of the electrical circuit to a wye configuration of the electrical circuit. In various aspects of the power distribution system, the ground location can be determined based at least in part on a length and an impedance of the electrical circuit wiring. The power distribution system can include a filter coupled to the voltage ground detection circuit. The power distribution system can include one or more transformers. The one or more transformers can connect each phase of a plurality of phase wires of the ungrounded power distribution system to a common wye tie point. The signal strengths can be measured in volts. Implementations of the described techniques may include hardware, a method or process, or a computer tangible medium.

Some implementations herein relate to a method and a system for distributed ground detection. The system can use components contained within other existing devices, such as motor overload protectors, generator controls, or power monitors, that measure voltage with some modification to the voltage sensing circuits to measure voltage from line to ground. For example, an overload protection device may include a first transformer. The first transformer may include a first primary-winding connected to a first phase of an electrical power source. The first transformer may include a first secondary-winding connected to a first voltage detecting circuit and a communication circuit. The first voltage detecting circuit can be configured to measure a first signal strength of the first secondary-winding. The overload protection device may include a second transformer.

The second transformer may include a second primary-winding connected to a second phase of the electrical power source and a second secondary-winding connected to a second voltage detecting circuit and the communication circuit. The second voltage detecting circuit can be configured to measure a second signal strength of the second secondary-winding. The overload protection device may include a third transformer that can include a third primary-winding connected to a third phase of the electrical power source and a third secondary-winding connected to a third voltage detecting circuit and the communication circuit. The third voltage detecting circuit can be configured to measure a third signal strength of the third secondary-winding. The overload protection device may further include a first switching element configured to selectively connect the first primary-winding to the second primary-winding in a voltage detection mode. The overload protection device may include a second switching element configured to selectively connect the first primary-winding to a ground in a ground detection mode. The overload protection device may include a third switching element configured to selectively connect the second primary-winding to the third primary-winding in the voltage detection mode. The overload protection device may further include a fourth switching element configured to selectively connect the second primary-winding to the ground in the ground detection mode. The overload protection device may include a fifth switching element configured to selectively connect the third primary-winding to the first primary-winding in the voltage detection mode. The overload protection device may include a sixth switching element configured to selectively connect the second primary-winding to the ground in the ground detection mode. The overload protection device may include a controller configured to switch the overload protection device between the voltage detection mode and the ground detection mode. Other embodiments of this aspect include corresponding computer systems, apparatus, and computer programs recorded on one or more computer storage devices, each configured to perform the actions of the methods.

The described implementations may include one or more of the following features. In various embodiments, the first switching element and the second switching element are configured to transition the first voltage detecting circuit from a voltage detection mode to a ground detection mode. In various embodiments, the first switching element and the second switching element can change a configuration of the overload protection device from a delta configuration to a wye configuration. In various embodiments, at least one of the first switching element and the second switching element is a mechanical switch. In various embodiments, at least one of the first switching element and the second switching element is electrical switch. In various embodiments, the controller is configured to compare the first signal strength, the second signal strength, and the third signal strength to determine a grounded condition. In various embodiments, the controller can be one of a programmable logic controller, a computer, or a dedicated microcontroller device. Implementations of the described techniques may include hardware, a method or process, or a computer tangible medium.

Some implementations herein relate to a method and a system for distributed ground detection. For example, the method may include measuring a difference from a tie point of the ungrounded electrical system and a ground point to determine if a grounded condition exists. If the grounded condition exists, for each phase of electric current in the ungrounded electrical system, the method may include measuring a first signal at a first overload protection device. The method can include measuring a second signal at a second overload protection device. The method can include measuring a third signal at a third overload protection device. The method can include comparing at least one of the first signal, the second signal, and the third signal to a stored threshold value determining a location of the grounded condition based at least in part on the comparing at least one of the first signal, the second signal, and the third signal to the stored threshold value. The method can also include displaying the location of the grounded condition on a display. Other embodiments of this aspect include corresponding computer systems, apparatus, and computer programs recorded on one or more computer storage devices, each configured to perform the actions of the methods.

The described implementations may also include one or more of the following features. The method may include activating relays in each of the first overload protection device, the second overload protection device, and the third overload protection device to change a configuration of the ungrounded electrical system from a delta configuration to a wye configuration. The method may include activating the relays in each of the first overload protection device, the second overload protection device, and the third overload protection device to change the configuration of the ungrounded electrical system from the wye configuration to the delta configuration. In various embodiments, the location of the grounded condition is determined based at least in part on a length and an impedance of electrical circuit wiring of the ungrounded electrical system. Implementations of the described techniques may include hardware, a method or process, or a computer tangible medium.

Numerous benefits are achieved by way of the present invention over conventional techniques. For example, embodiments of the present disclosure provide a distributed ground detection system that enables more operational uptime for various systems in an electrical distribution system as compared with a centrally located detection system. Voltage detection devices can be distributed throughout an electrical system to measure a voltage at various points. The voltage detection devices can be configured to operate in a ground detection mode. In some embodiments, a communication network can be used to provide remote reading of ground signal strengths of two or more overload detection devices. A calculation engine can be configured to determine a ground location based at least in part on relative signal strengths based at least in part on the measured ground signal strengths. The determined ground location can be displayed to enable techniques to quickly determine the location of the grounded condition and isolate the grounded condition without the unnecessary loss of other critical systems. These and other embodiments of the disclosure, along with many of its advantages and features, are described in more detail in conjunction with the text below and corresponding figures.

DETAILED DESCRIPTION OF THE INVENTION

The following detailed description of example implementations refers to the accompanying drawings.

Figure 1A:
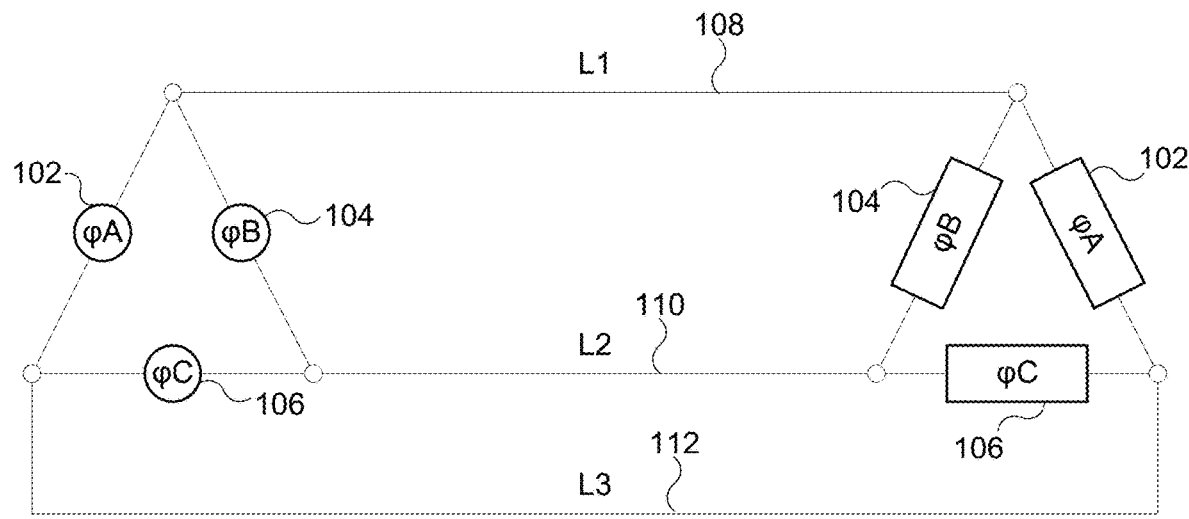
FIG. 1A illustrates an exemplary ungrounded delta configuration electrical system.

FIG. 1 illustrates an exemplary ungrounded delta configuration electrical system 100. For example, to improve battle-readiness, ship distribution systems can be made ungrounded, meaning the three phases of power (i.e., φA 102, φB 104, and φC 106) of line-1 108, line-2 110, and line-3 112 are not connected to the hull or frame of the ship or ground. If a connection develops between one of the lines and the structure of the ship or grounded, it is considered grounded.

Figure 1B:
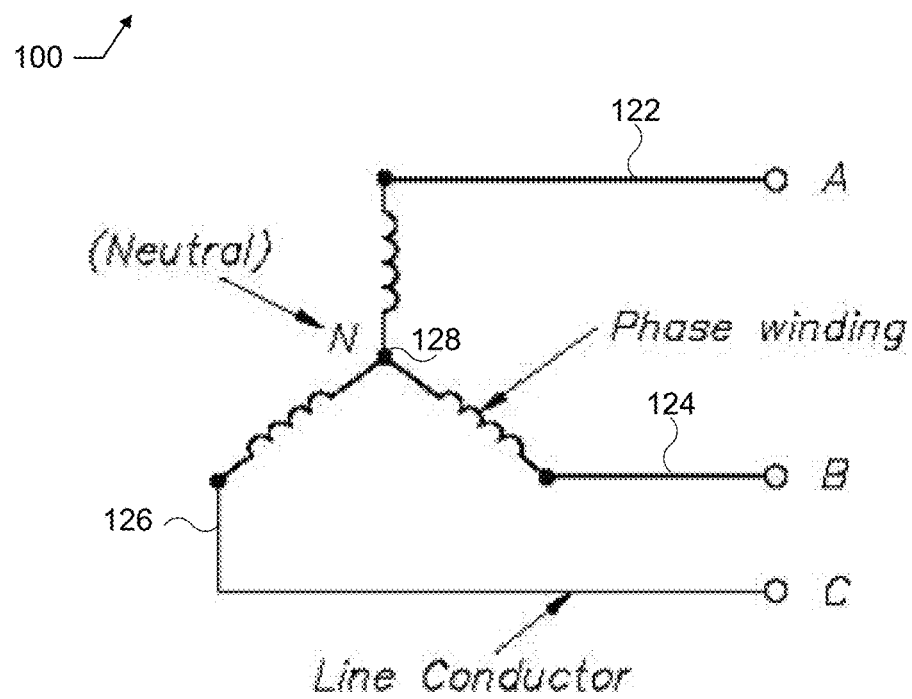
FIG. 1B illustrates an exemplary ungrounded wye configuration electrical system.

FIG. 1B illustrates an exemplary ungrounded wye configuration electrical system 150. The ground detection methods can be performed from the line regardless and agnostic of wye or delta configuration in the generation or load systems. In a wye configuration Line-A 122, Line-B 124 and Line-C 126 can be coupled together at a neutral point 128.

Figure 2:
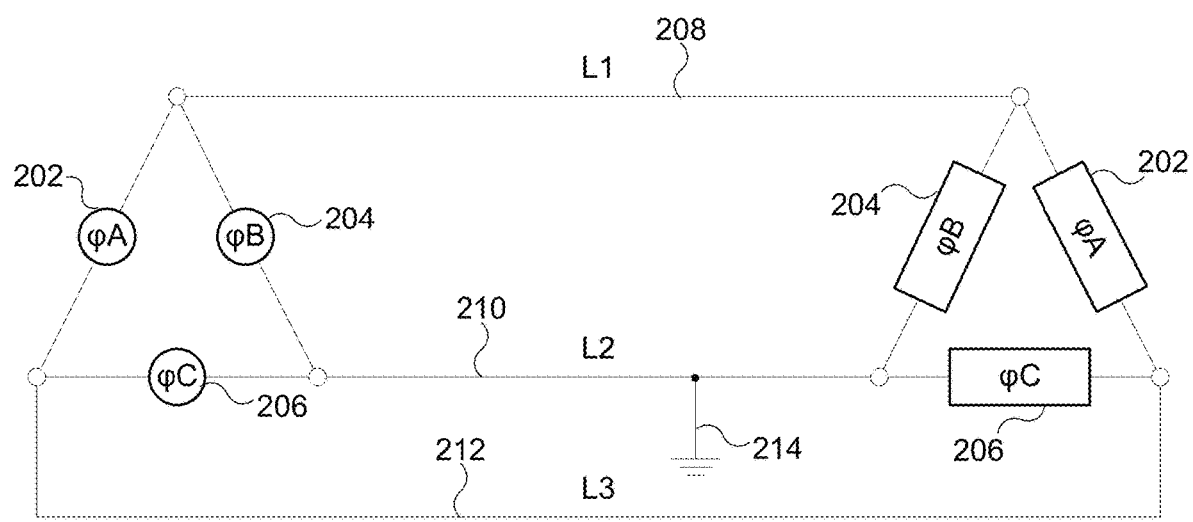
FIG. 2 illustrates an exemplary delta configuration electrical system that is grounded on one line.

FIG. 2 illustrates an exemplary delta configuration electrical system 200 that is grounded on one line. The delta configuration electrical system 200 can include three phases of power (i.e., φA 202, φB 204, and φC 206) of line-1 208, line-2 210, and line-3 212 respectively. When a ground 214 develops on one line of an ungrounded system, such as on line-2 210 as shown in FIG. 2, the system may still operate without significant functional impact or power loss. Any other ground developing on line-2 210 can hinder finding and removing the grounds. For an ungrounded wye system 150, as shown in FIG. 1B, the same initial conditions of no major impact are true. If only one ground develops on an ungrounded wye system, no degradation of the system would be noticed.

Figure 3:
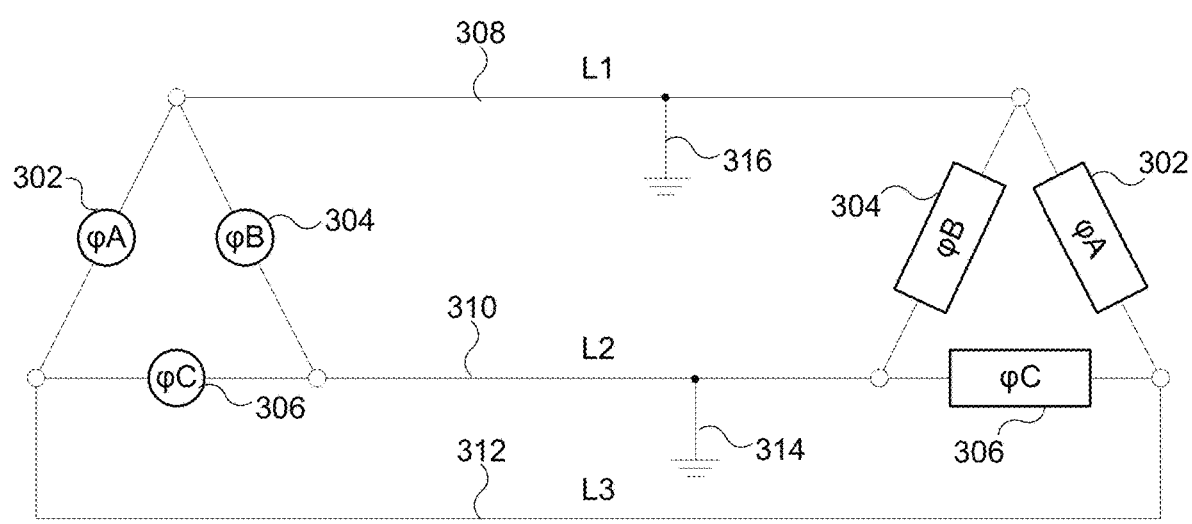
FIG. 3 illustrates an exemplary delta configuration electrical system that is grounded on two lines.

FIG. 3 illustrates an exemplary delta configuration electrical system 300 that is grounded on two lines. The delta configuration electrical system 300 can include three phases of power (i.e., φA 302, φB 304, and φC 306) of line-1 308, line-2 310, and line-3 312 respectively. A first ground 314 can develop on a first line (e.g., line-2 310). A second ground 316 can develop on a second line (e.g., line-1 308). The second ground 316 can act as a line-to-line short, reducing the ability for the three-phase system to maintain voltage and power from supply to load. Depending on the severity of the grounds (e.g., a first ground 314 and a second ground 316), ground-fault currents can be produced, which can cause the generator to trip offline or damage distribution components. The effects would be similar for wye system 150, as shown in FIG. 1B, that is grounded on two lines.

Figure 4:
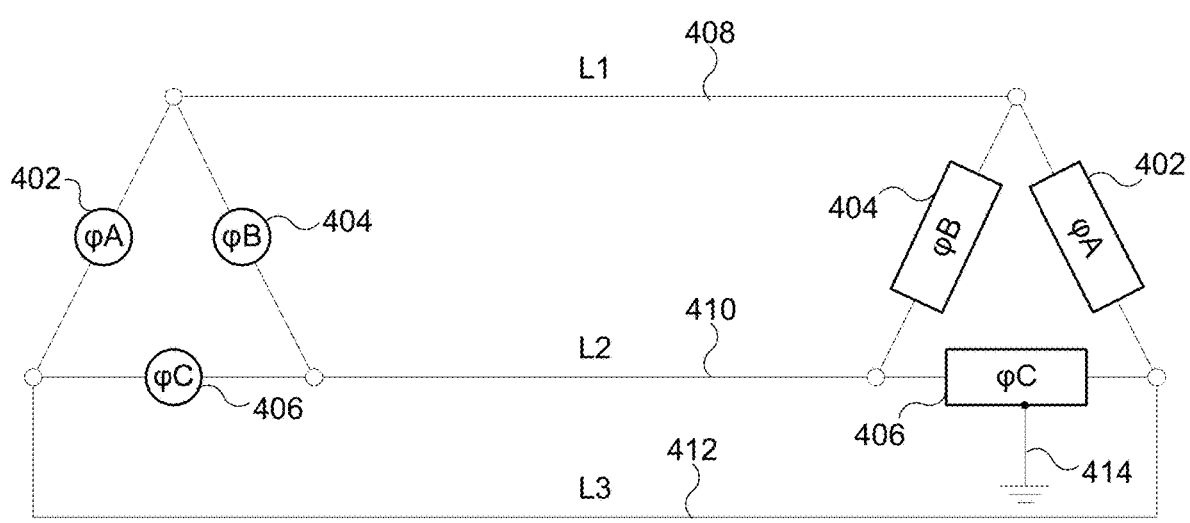
FIG. 4 illustrates an exemplary delta configuration electrical system that is grounded on one phase.

FIG. 4 illustrates an exemplary delta configuration electrical system 400 that is grounded on one phase. The delta configuration electrical system 400 can include three phases of power (i.e., φA 402, φB 404, and φC 406) of line-1 408, line-2 410, and line-3 412 respectively. Developing a ground on one phase (e.g., φC 406) of a delta-connected system 400, as shown in FIG. 4, presents other challenges when trying to locate the ground. The ground on one phase (e.g., φC 406) can show up partially on both lines attached to that phase (e.g., line-2 410 and line-3 412. The upside to having the ground occur in one phase is that it may only affect a single component, whether it be a load (e.g. motor, transformer primary) or a source (e.g. generator, transformer secondary) on the distribution line. Similar observations can be made in an exemplary wye configuration electrical system 150 as shown in FIG. 1B.

When common mode current detectors are installed within motor starters, indication of a ground current on a single detector can locate the grounded circuit. For these installations, grounds developing on the lines or phases of the motor circuit downstream of the detector can show up as common-mode current leakage from the lines to ground. This can be more commonly found on grounded systems, as the ground current needs a return path to flow.

Finding ground fault currents on ungrounded systems implies that the return path for the common-mode currents can either be through another strongly grounded point or distributed throughout many weaker points. On a system in which grounds are undesirable, reliance on common mode current to detect the ground may allow for more system degradation before identifying the decay.

Ground Location Impact on Severity. Depending on where a ground may develop can determine how severe the ground affects the system. A ground on the main distribution bus or at the output of a generator can require more of the system to be without power than a load that can be isolated without disrupting power to any other part of the system. Each case will have a different impact on system readiness.

Ground fault current detection can be found in many points of distribution systems, including feeder circuits and load branches. The general use of ground fault detection can be to protect against wiring damage that may cause personnel hazard. A common example can be a ground fault current interrupter (GFCI) outlet found in any location where water is likely in use around electricity, such as the lavatory. Safety concerns from inadvertent submergence of electrical equipment, such as a corded electric razor or hair drier caused the inclusion of GFCI outlets. Unintentional personnel loss of life can be considered an undesirable and severe result for the purposes of this discussion, prevention of which can be a major goal of the proposed system of distributed ground detectors.

Figure 5:
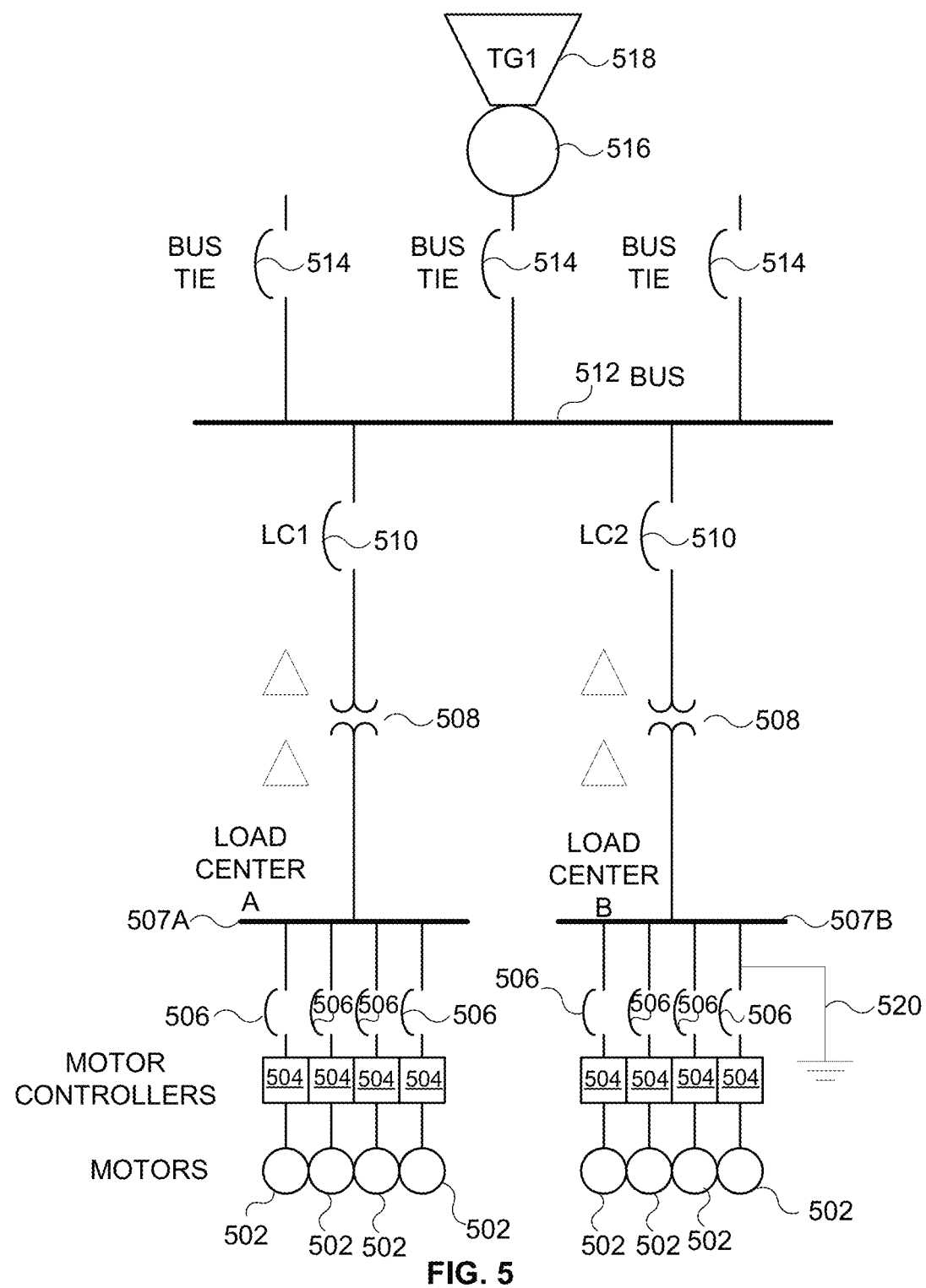
FIG. 5 illustrates an exemplary electrical distribution system.

FIG. 5 illustrates an exemplary electrical distribution system 500 with an arbitrary unwanted ground. An example section of a distribution system is shown in FIG. 5 with a generator 518 or alternate bus sections as the potential sources for power and subordinate load centers 507 distributing power to motor loads. The generator 518 can be powered with a steam turbine, a diesel engine, and/or a gas turbine engine. This simple example has the elements needed to discuss the severity and location of grounds developing on the exemplary electrical distribution system 500. The bus ties 514 allow for connections of the generator 518 to other sections, possibly including an emergency generator or uninterrupted power supply (UPS) through a bus 512. The generator control circuits can be attached to the generator 516 and can monitor various electrical parameters such as voltage, current, frequency, power, temperature, and oil pressure, etc. The control of the generator system 516 can be generally isolated from the power being generated for the distribution, via control power transformers.

One or more motors 502 can be connected via a motor controller, a breaker 506, isolation transformer 508, and a load center feeder breaker (LC1 or LC2) 510 to the bus 512. FIG. 5 illustrates a ground 520 on a line in load center-B 507B. The load center feeder breakers (e.g., LC1 and LC2) 510 can be breakers feeding the load center 507 from the main distribution bus 512. Isolation transformers 508, as shown in FIG. 5, can provide a means to limit the severity of the ground found in a branch circuit from affecting the main bus 512. The isolation transformer 508 can also limit the ability of a central ground detector from finding a ground on a branch or motor circuit. There are potentially filter circuits in the distribution network, but they are not germane to this discussion, except that grounds can develop in them the same as any component attached. LC1 and LC2 510 are used to isolate entire load centers 507 from the main bus 512 when hunting for ground location with present manual ground location methods. In FIG. 5, a ground detector on the main bus will not see grounds on the load centers 507, and a ground detector on the load center 507 will not detect grounds on the main bus, because of the isolation transformer 508.

Consider a ground on the windings of generator 518. Losing the generator 518 can reduce the power supply capability and flexibility of the system, maybe even requiring the use of emergency power supply options. The lockout tag-out (LOTO) process to secure the generator 518 can be complex, requiring the source of its power to be secured, which can include mechanical systems.

If the ground is in the line from the generator breaker to the bus 512, the LOTO process can require the entire bus 512 to be secured to affect repairs. Rigging temporary power to the subordinate load centers 507 may or may not be an option, which can mean that all loads attached to the bus 512 would be unavailable until the repair is completed.

Consider the loss of an auxiliary vent fan that can be one of the many motor-loads powered by the load center 507. The auxiliary vent fan can reduce air flow to a single location, potentially requiring the use of a portable air mover if the ventilation of the area is critical; on the contrary, it may not require action if the area could survive without the ventilation for the duration of the repair. The LOTO for the vent fan will be simple, probably not requiring any mechanical systems to be secured while affecting repairs to the electrical components. Only one load would be lost for the duration of the repair.

Grounds occurring within the switchboard on the backbone of the distribution system are the most severe when they require securing power sources because they cause the most equipment to become unavailable during the repair activity.

Aside from battle damage, grounds can occur from degrading insulation (decay from time or chemicals) or careless treatment of equipment during routine operations. To prevent minor physical insulation damage accumulating over time, armoring can be added to the cables. The cables can also be positioned away from areas of physical interaction with creatures, chemicals, or constructs. One common ground cause is nicked insulation on a cable (physical wear and tear), which could be located anywhere on the system where wires are used. Common locations for wire connections are from the switchboards to the transformers, from the transformers to the load centers 507, from the load centers 507 to the motor starters, inside the motor starters, or from the starters to the motors. The time to replace a wire can vary with run length and connection location. Some wires are easy to access and easy to run (e.g. five foot of a triple conductor cable with 14 American Wire Gauge (AWG) conductors between a motor starter and a motor terminal box). Other wire runs can take more than a single work shift to correct (e.g., fifty feet of triple conductor cable with 4/0 AWG conductors run through several watertight bulkheads and decks from inside a switchboard to inside a load center 507).

When methods of ground prevention are unsuccessful, finding the first ground prior to subsequent grounds developing on the system can reduce the time to locate and remedy system grounds. There can be two main types of ground detection devices. A first type of ground detection devices are those that measure voltage from line to ground. A second type of ground detection devices are those that measure common mode current to ground. Each type detects a slightly different section of the system with relation to the detector.

For the first type of devices using the voltage method, the device detects the presence of a ground on anything galvanically connected to the sensor. The second type of device detects only the presence of a ground electrically downstream of the common mode current sensor, and only if there is current flowing through the ground connection. If a ground occurs upstream of the common mode current sensor, the common mode current going to ground would not be detected. If the current flow from the ground is negligible because there is no return path, the ground would not be detected. Both types of devices can be employed to provide means for finding and isolating a grounded circuit.

Previously, ground detection circuitry using the voltage method was used for most ungrounded electrical systems that are physically connected in switchboards (e.g., bus 512) or load centers (e.g., load center-A 507A or load center-B 507B). Two reasons can be identified for this choice. With this placement, the detected ground can be identified for a large section of the distribution system with the fewest number of detectors, thus saving on overall system cost. As the most severe system impact identified was when grounds developed in the switchboard, detecting the location of grounds in the switchboard was a critical task. Adding more ground detectors to other parts of the system was possible, but usually prohibited by cost or physical constraints (e.g., size, weight, connection availability).

Through opening and closing breakers 506, the location of the ground 520 could be further narrowed to a subsection of the distribution system, such as a branch circuit or motor load with the common ground detector of the switchboard, up to the points of isolation in the system. This process requires power disruption in suspect sections of the distribution system until the ground location is discovered. Even before the ground 520 is isolated and repairs are determined, there can be a large impact to the operational readiness of the system with the use of a single ground detector in the switchboard or the load center.

Figure 6:
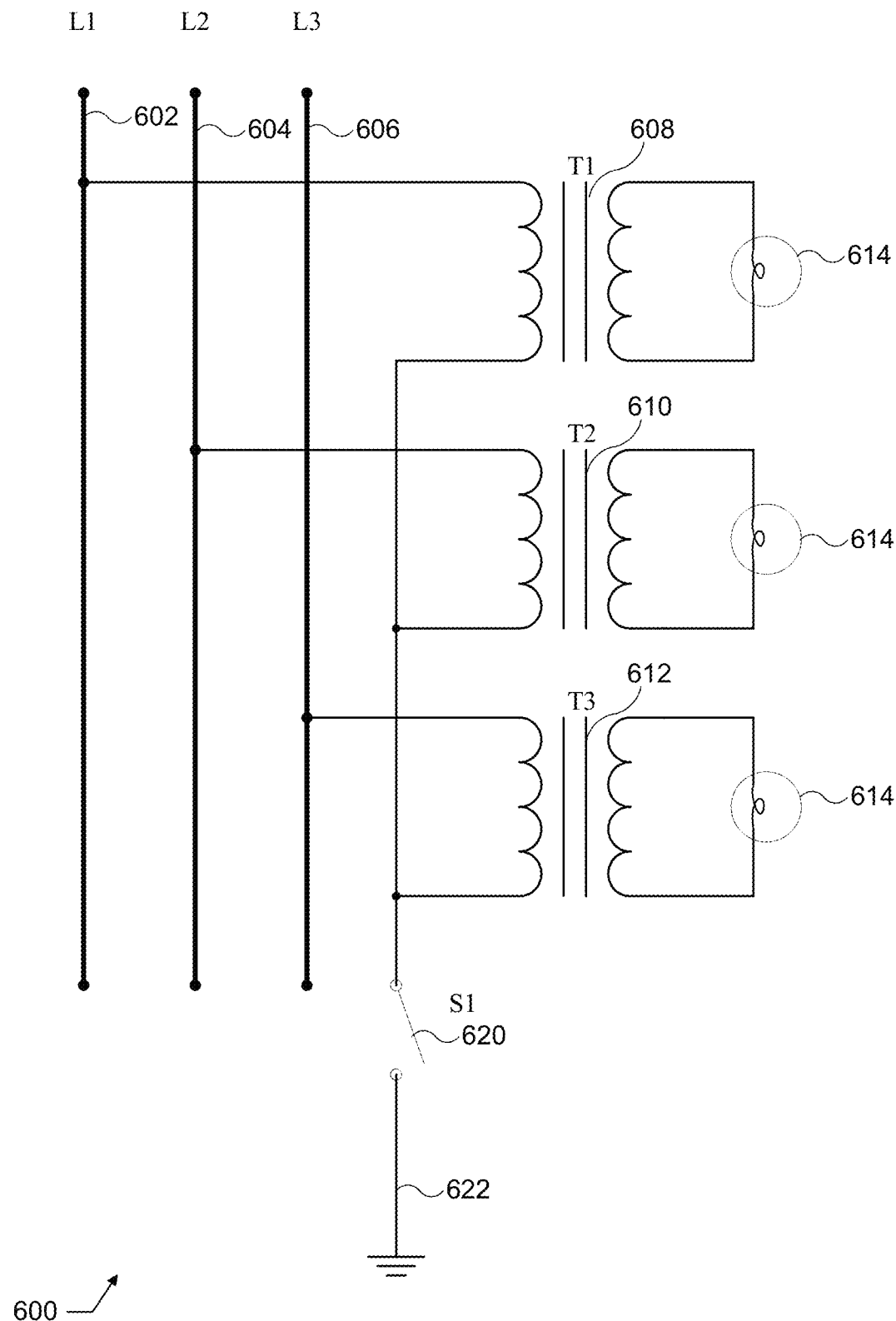
FIG. 6 illustrates a schematic of a lamp-based ground detection circuit.

FIG. 6 illustrates a schematic of a lamp-based ground detection circuit 600. FIG. 6 illustrates a primary winding of a first transformer 608 connected to a first line (L1) 602 and to a ground 622 via a switch 620. The primary windings of a second transformer 610 connects a second line (L2) 604 to a ground 622 via a switch 620. The primary windings of a third transformer 612 connects to a third line (L3) 606 to a ground 622 via a switch 620. Indicating lamps 614 can be connected to the secondary windings of each of the first transformer 608, the second transformer 610, and the third transformer 612. One principle of ground detection on an electrically live system can include measuring voltage from line-to-ground and comparing the measurement to a threshold value. If the line-to-ground voltage measures zero or near zero volts, the line is grounded.

As shown in FIG. 6, the first transformer 608, the second transformer 610, and the third transformer 612 are connected from line to a common wye tie point, with their secondary windings powering indicating lamps 614. An operator can observe the indicating lamps 614 to determine an indication of a ground in each of the lines (e.g., the first line (L1) 602, the second line (L2) 604, and the third line (L3) 606). There can be an analog quality to this type of detector, as the brightness of the bulbs would indicate the strength of the ground on the respective line.

The wye tie point is left ungrounded under normal operation. When the switch (S1) 620 is shut, the wye tie point is connected to ground 622. The primary windings are then connected from line to ground 622 through the switch 620. Under normal operation, the indicating lamps 614 are lit to show that there is line-to-line voltage. This serves as a check to ensure the lamps 614 are working. Connecting the wye tie point to ground 622 will leave the lamps 614 illuminated if there are no grounds on the system. If a ground occurs, the transformer that is attached to the line that is grounded will develop no voltage across its primary, and the lamp will not light, indicating to the operator that line is grounded. When the switch is released, the lamps will again illuminate to show line-to-line voltage is fine. This is an example of a manual ground detection circuit with a set threshold, requiring the operator to change the switch position and read the lights. The threshold is set by the voltage requirements of the transformer and lights. A trained operator can also predict grounds developing on the system based on how the intensity of each lamp changes from one switch position to the other. Each lamp may shift intensity the same amount or differently depending on the voltage of the line, age of the lamp or transformer, or existing loads on the system.

Figure 7:
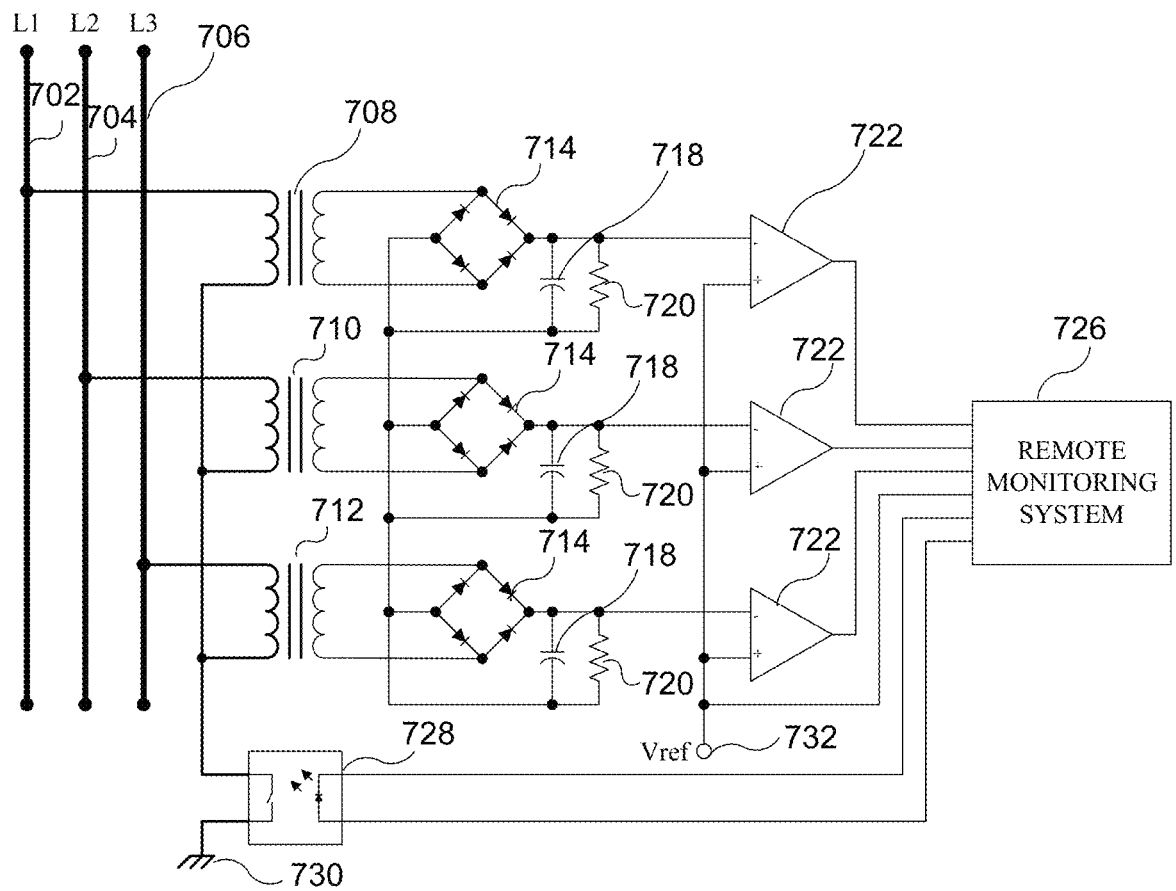
FIG. 7 illustrates a simplified remote ground detector.

Similar systems have been created to remotely monitor the output of the transformer. FIG. 7 illustrates a simplified remote ground detector circuit 700. In the simplified ground detector circuit, a primary winding of a first transformer 708 connected to a first line (L1) 702 and to a ground 730 via a switching element 728. The switching element 728 can be remotely operated. The primary windings of a second transformer 710 connects a second line (L2) 704 to a ground 730 via the switching-element 728. The primary windings of a third transformer 712 connects to a third line (L3) 706 to a ground 730 via the switching element 728.

FIG. 7 illustrates the wye connected voltage sense connection with the switching element 728 that would change the connection between line-to-line voltage sense and ground voltage sense. Transformers 708, 710, and 712 are connected in a wye configuration with a floating tie point when switching element 728 is open.

The switching element 728 can include a solid-state relay. The switching element 728 can change the connection of the wye tie point from floating to grounded. The output signals from the transformers (e.g., the first transformer 708, the second transformer 710, and the third transformer 712) can be proportional to the line-to-line or line-to-ground voltages as described above. FIG. 7 shows a simplified schematic with the elements needed to isolate the detector, condition the proportional signal, and report it to a remote monitoring system 726.

A portion of the remote ground detector circuit 700 translates the output of the transformers to an analog or digital electronic signal. The secondary windings of the remote ground detector circuit 700 can be connected to a bridge rectifier 714, a capacitor 718, a resistor 720 and an amplifier 722. The signal from the amplifier 722 and be sent to the remote monitoring system 726.

When disconnected from ground 730, the line-to-line proportional signal will be monitored and compared with nominal values to validate the circuit is working. When connected to ground 730, the line-to-ground proportional signal will be monitored and compared with threshold levels set to determine if a ground is present on a line. The remote circuit allows the ground detection physically connected in the switchboard or load centers to be directly monitored by the electric plant operator rather than relying on additional personnel.

Unlike the indicating light method of ground detection described in FIG. 6, the severity of the ground could be determined by objectively quantifying the magnitude of line-to-ground voltage rather than just a threshold limit. A small drop in voltage between line-to-line and line-to-ground would indicate a weaker ground than the voltage dropping to zero line-to-ground. All systems can be slightly different, so baseline data would have to be used after commissioning of the system to determine nominal voltage deviance at each detector.

With indicating lights or simple threshold detection, there is no indication of the distance the detector is from the ground that was developed. With an analog output from the detector, the gradient will be proportional to the distance. Detectors have been developed that use analog sensing signals and a known piece of cable to determine the distance of the ground from the detector. Using this method as a single detector is still limited by isolation boundaries in the system, and multiple detectors can provide significant benefits. Unfortunately, the distance cannot be determined from a single point of reference for such short cable lengths due to the variance in ground condition, which also can lend to the recommendation for multiple detectors in the system. The ground can have a much more significant effect on the proportional voltage or current.

In various embodiments, a switch of an ungrounded power distribution system can be configured to activate a plurality of relays that change a delta configuration of the electrical circuit to a wye configuration of the electrical circuit. The change in state from delta to wye is on the voltage detection circuit, but only if the voltage detection mode of operation is delta connected. It does not have to be. Voltage detection can be wired in a wye configuration with a floating neutral. The disclosure concerns how to measure accurately ground conditions even in unbalanced line conditions. If it is desired to measure voltage in that way, the switching method from voltage to ground detection mode would be simpler. The switching discussion on the relays for an alternative method would be one switching relay on the neutral tie point to ground.

Figure 8:
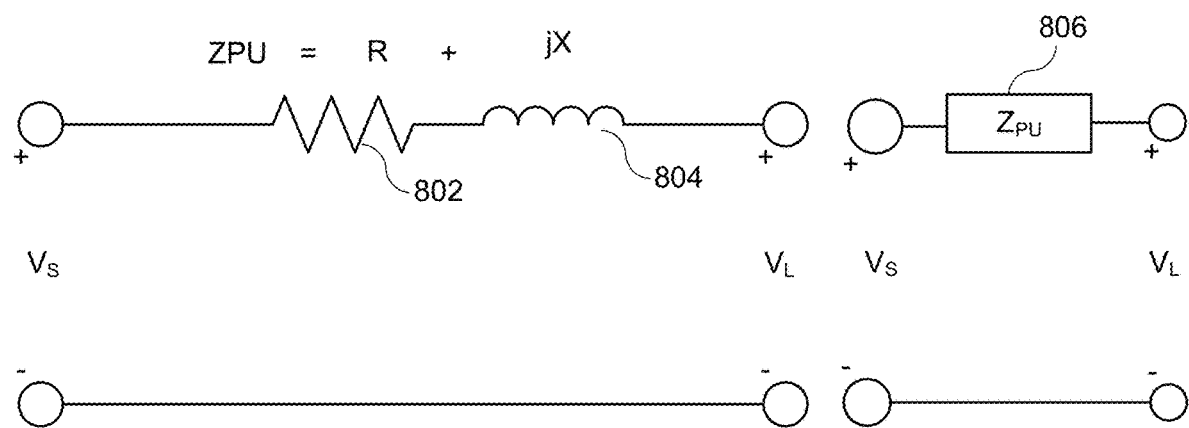
FIG. 8 illustrates a per unit short line model.

FIG. 8 illustrates a per unit short line model 800. Each line of the distribution system can be viewed the same way that a transmission line is viewed. Cables less than 80 km (50 miles) in length and with an applied voltage of less than 69 kV can use the short line model for transmission lines, and the capacitance of the line can often be ignored. This can account for voltage differences along the line from source voltage ($V_S$) to load voltage ($V_L$).

The short line model obtains the total impedance by multiplying the per unit impedance (ZPU) of the line with the length (l) of the line. The per unit impedance (ZPU) can be calculated as resistance (r) 802 of the line plus inductive elements (jx) 804. The ZPU equation can be as follows:

$$Z=(r+j\omega L)*l,$$

where r is resistance measured in ohms, j is square root of negative one, w is angular frequency ($2\pi$ times the frequency in Hertz (Hz)), and L is inductance value.

Assuming the per unit impedance (ZPU) 806 of an installation does not change within the time of interest (during the troubleshooting process), the measurement of the line impedance (Z) can be proportional to the length of the line (l). Therefore:

$$Z \propto l.$$

The long-term effects of change in impedance can have no effect on the short-term process of localizing the ground, and thus can be ignored for the purpose of applying this distributed ground detection method. It is only the relationship of the impedance with respect to line length that is going to be used and seen as different between multiple sensors in the system.

On electrical systems, voltage droops due to load and drops due to the impedance of the line. The significance of the voltage droop and voltage drop can only be handled case-by-case and do not follow well to generalization. The principles of voltage drop due to line impedance can be used to determine how close a detector is from the point of a developed ground. The method being described assumes the voltage source does not change in intensity during the troubleshooting activity, but that is another thing the operator must be cognizant to monitor and/or control.

Figure 9:
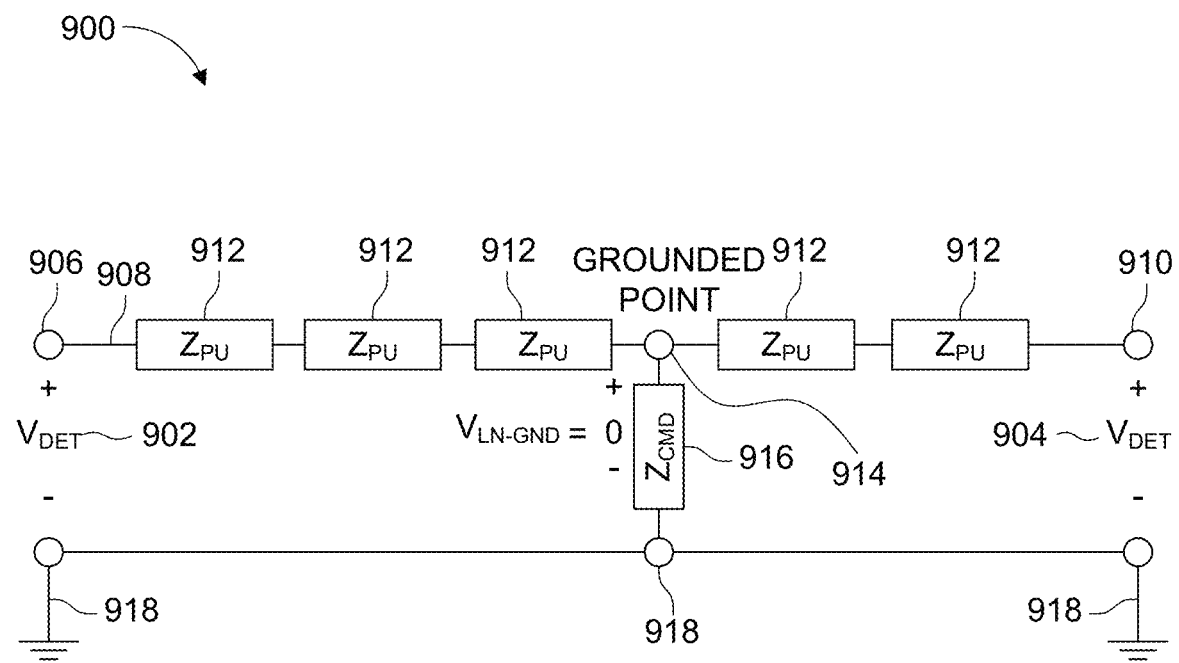
FIG. 9 illustrates a multiple detector line model.

FIG. 9 illustrates a multiple detector line model 900 using lumped impedances. A first detector 902 can be coupled to a first point 906 in a line 908. A second detector 904 can be coupled to a second point 910 in line 908. The line 908 can be represented by a series of resistive (R) and inductive (jX) elements 912.

If a ground is developed at a ground point 914 that close to a detector, the resistive (R) and inductive (jX) elements 912 in series from grounded point 914 to the detector will have a smaller impedance because there are fewer units of impedance. Each detector voltage (VDET) will be relatively higher the further the detector is from the grounded point 914, assuming the voltage to ground at the grounded point 914 is close to zero volts. Each detector (e.g., the first detector 902 and the second detector 904) can measure the voltage drop across the impedances of the line 908 plus the impedance of the grounded point 914. More line 908 between the detector and the grounded point 914 will create more impedance, which will register as a higher voltage from the detector to the ground point 914. The ground point impedance 916 will be the same for both detectors, so the only difference will be the total impedance from the length of line 908.

This model assumes the same per unit cable impedance along the line 908. This will not always be the case, but the trained operator on a static installation can know which loads are run with larger cables, longer or shorter runs, and high inductance cable ways. This can be evaluated in each case but becomes fixed after installation and does not change during the grounding event.

With the inclusion of voltage sensing in motor overload protection devices, similar hardware can be included in motor starters equipped with this feature. If the device is capable of measuring line-to-line voltage, it can be possible to connect the voltage detection in a wye fashion and selectively connect the wye tie point to ground 918 to activate ground detection, with a switching element and ground connection. The voltage measured from line-to-line under normal operating conditions can be used for line monitoring and voltage protections. The voltage measured from line-to-ground can be used for distributed ground detection.

If the distributed ground detection shows gradients of ground voltage magnitude, the detectors showing lower line-to-ground voltages can be closer to the grounded point 914, helping narrow the physical connection location (e.g., using triangulation techniques). This can work for any sections of the electrical system that are galvanically connected.

An additional benefit of distributing the ground detectors into the motor controllers can be that they will likely be capable of detecting grounds on parts of the system that are isolated from each other with transformers and bus ties. Without dropping any power to the plant, isolation operations could be conducted to separate multiple ground detectors from each other to localize the ground without affecting the operational output of the electric plant during the identification process.

Smart motor protection often comes with remote monitoring capabilities using an industrial network connection. A remote operator could activate the ground detection from another networked location, such as a central control room. If a ground was detected, the process of identifying the exact location could be conducted with fewer steps. The electric plant operator or load dispatcher would be able to directly watch the grounds while modifying the connections around the distribution system. This direct feedback will save time in determining the next connection modification, thus reducing the overall time to find and resolve the ground issue.

For system installation and calibration when the system shows no grounds present, activating two ground detectors would provide a means of determining relative distance between each detector. Even if the per unit impedance for one branch is different than that of another branch, cycling through all pairings of the detectors would provide baseline data to identify which legs are electrically longer or shorter. Having the two points of ground inserted at known locations and through known impedances would allow the detector voltages to be compared for the same electrical distance. Alternatively, a known ground point could be inserted on the system at a known physical length from each detector and calibrated for that fixed ground impedance. If all detectors were adjusted using the same ground impedance, then distances could be gleaned regardless of the unwanted future-occurring ground point impedance.

Figure 10:
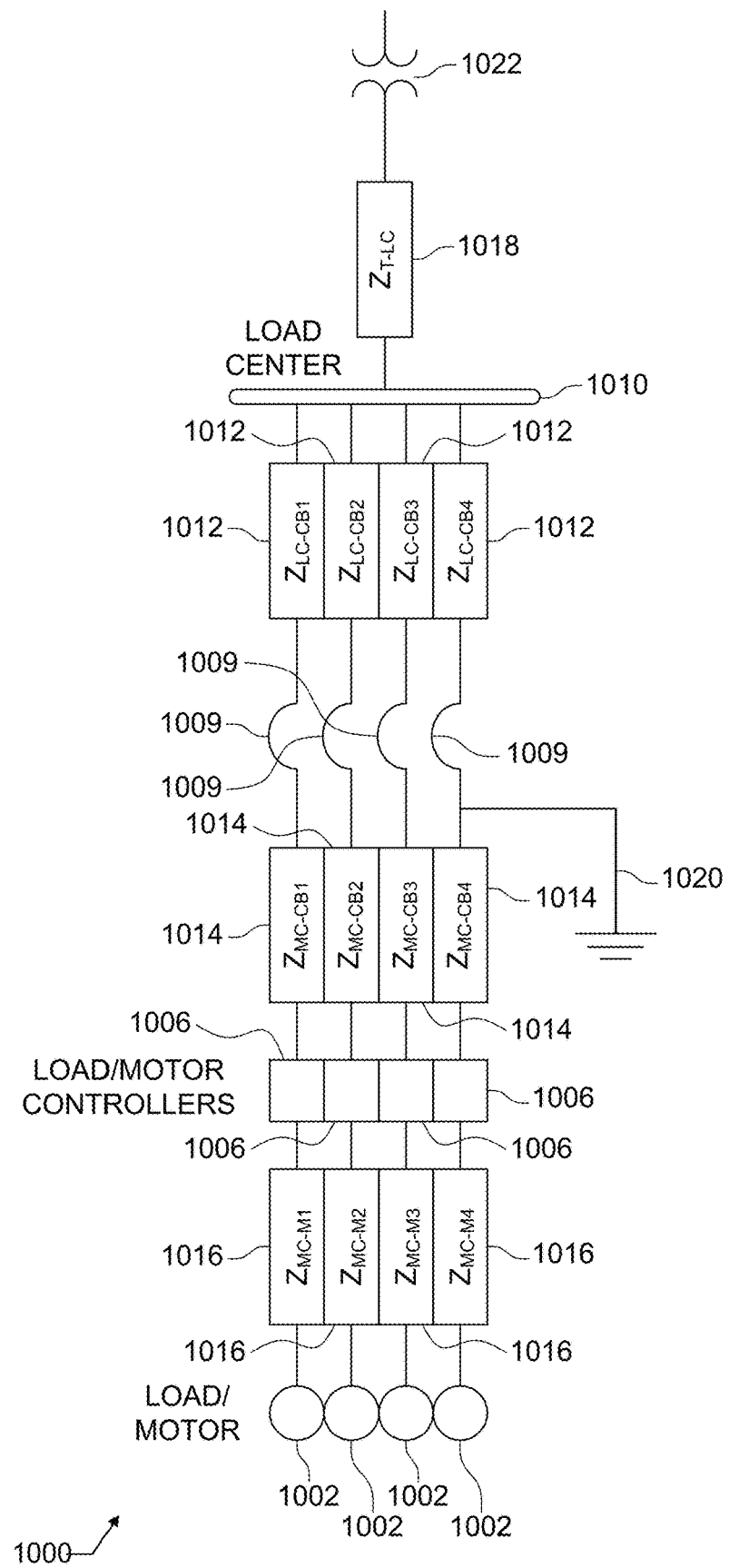
FIG. 10 illustrates a distribution system with an unwanted ground.

FIG. 10 illustrates a distribution system 1000 with an unwanted ground. In the electrical distribution one or more loads 1002 (e.g., motors) can be connected to load controllers 1006 (e.g., a motor controller). The load controllers 1006 can be connected to a load center 1010. The load center 1010 can be connected to one or more power sources (not shown).

FIG. 10 can use a portion of the example system from FIG. 5. Ground detectors can be installed in the switchboard, and distributed analog voltage-based ground detectors within the load controllers 1006. First ground detectors 1012 can be installed between the breakers 1009 and the load center 1010. Second ground detectors 1014 can be installed between the breakers 1009 and the load controllers 1006. Third ground detectors 1016 can be installed between the load controllers 1006 and the load 1002. Forth ground detectors 1018 can be installed between the load center 1010 and the power source. A ground 1020 developing on a line between one of the load centers 1010 and a load controller 1006 would be detected as a ground 1020 by all load controllers 1006 connected to the load center 1010 because there are no transformers between them. The second ground detector 1014 in the switchboard and the third ground detectors 1016 in the motor controllers on the other load center would not see a ground 1020 because they are galvanically separated by the feeder transformer between the switchboard and the load center 1010. The first step toward locating the ground 1020 would happen on the same step as identifying that a ground exists on this galvanically connected section of the system.

For the simplification of this example, it is assumed that all elements of impedance are identical, given the understanding that a real-world example would have different line lengths and wire gauges, which cause varying impedances throughout the system. These variations will be recognized by the operator or by the system software if automating the process of locating the ground.

The second step would be to read the ground strength and determine which load branch circuit was most likely containing the ground and stopping the load with the highest ground strength (lowest line-to-ground voltage). The voltage of the ground detectors would be proportional to the impedances between the detector and the ground being detected. In this example, the voltage on the detector in the fourth load controller ($V_{DET4}$) should be the lowest relative value when compared to baseline data from the system.

$$V\_DET1 \propto Z\_(MC\text{-}CB1) + Z\_(LC\text{-}CB1) + Z\_(LC\text{-}CB4)$$

$$V\_DET2 \propto Z\_(MC\text{-}CB2) + Z\_(LC\text{-}CB2) + Z\_(LC\text{-}CB4)$$

$$V\_DET3 \propto Z\_(MC\text{-}CB3) + Z\_(LC\text{-}CB3) + Z\_(LC\text{-}CB4)$$

$$V\_DET4 \propto Z\_(MC\text{-}CB4) = Z\_(MC\text{-}M4)$$

Given the assumption that all units of impedance are identical in this simplified example, seeing $V_{DET4}$ proportional to one unit of length would lead the operator to assume the ground was in the line from the circuit breaker 1009 to the load controller 1006 or from the load controller 1006 to the load 1002 (e.g., a motor).

Stopping the fourth load 1002 (e.g., a motor) would isolate the cable from the load controller 1006 to the load 1002 and still allow the detector to maintain power and network capabilities. If the ground 1020 is removed, the repair activity could be identified and planned for the cable from that load controller 1006 to that load 1002.

In this example, the ground 1020 is not removed; therefore, the breaker 1009 of that branch would be the next step. Before opening the breaker 1009, the load 1002 would have needed to be stopped in a controlled manner, so no extra steps have been introduced. Opening the breaker 1009 would secure power to the questionable load controller 1006, so the ground detector and network signal would be lost from that line. In this example, opening the breaker 1009 will remove the grounds seen on the other detectors; so, the repair activity for the cable between the circuit breaker 1009 and the load controller 1006 could be planned.

If the ground 1020 had not been removed, the fourth load 1002 could be placed back in service before securing the next best candidate, thus maintaining operations while hunting for the ground 1020. If the ground 1020 is found in another branch, the operator would gain the experience of interpreting the signal strengths, allowing better calibration of his/her eyes and decision making in the future. This could also be completed with machine learning using inserted grounds to train the system of proportional signals and the known location.

However, if the ground 1020 is truly closest to that load 1002, it is more likely that the ground 1020 will be found within the load center 1010. In order to determine if the ground 1020 is within the load center 1010, first each load 1002 would have to be ruled out. This still does not introduce additional steps from previous ground detection methods. If the ground detector was centrally located in the load center 1010, each load 1002 would have to be secured to determine if the ground was in a branch rather than in the load center 1010. Having the relative ground strengths will reduce the guesswork on which circuit is most likely and help with identifying electrically and potentially physically where the ground 1020 is likely to be found within the load center 1010 if it is not found in the branch circuits.

In a second case, a ground 1020 can be in the secondary winding of the isolation transformer 1022. The relative impedances from each of the detectors in the load controllers 1006 can be equal and the detectors would report the same relative distance. The only place in the system that would report this equal distance from all detectors is the secondary windings of the transformer.

$$V\_DET1 \propto Z\_(MC\text{-}CB1) + Z\_(LC\text{-}CB1) + Z\_(T\text{-}LC)$$

$$V\_DET2 \propto Z\_(MC\text{-}CB2) + Z\_(LC\text{-}CB2) + Z\_(T\text{-}LC)$$

$$V\_DET3 \propto Z\_(MC\text{-}CB3) + Z\_(LC\text{-}CB3) + Z\_(T\text{-}LC)$$

$$V\_DET4 \propto Z\_(MC\text{-}CB4) + Z\_(LC\text{-}CB4) + Z\_(T\text{-}LC)$$

The same method can show that a ground in the load center 1010 can be exactly two impedance units away from each detector, and the only location that is exactly two units away from each detector is the load center 1010. Notice this scenario does not use a ground detector in the load center 1010 because there is no galvanic isolation between the load center 1010 and the load controllers 1006. The fractional cost increase to the load controller 1006 would be offset by the removal of the standalone detector within the load center 1010. Provided there were at least two load controllers 1006 galvanically connected, a ground within the load center 1010 would be detectable while securing other branch circuits. Depending on the incremental increase in load controller 1006 cost, the number of controllers, and the cost of the standalone detector, this offset would vary.

Distributing analog ground detectors throughout a system makes it possible to reduce the time it takes to locate grounded circuits in a distribution system. Within each galvanically connected section, relative strengths of the analog detector signals can be compared to find the grounded piece of equipment with fewer steps using triangulation. Networking the ground detectors allows a central operator to orchestrate the isolation process with minimum impact to the operational readiness of the system.

With hardware present in some modern electronic overload protection devices, it could be possible to detect grounds from the perspective of the load branch for a fractional increase in cost to the motor controller. The fractional increase in cost of each motor controller would be offset by the cost of a central standalone ground detector that would no longer be required. If the labor rate of the operator is taken into consideration for the time spent finding and fixing the ground, the cost benefit increases.

Figure 11A:
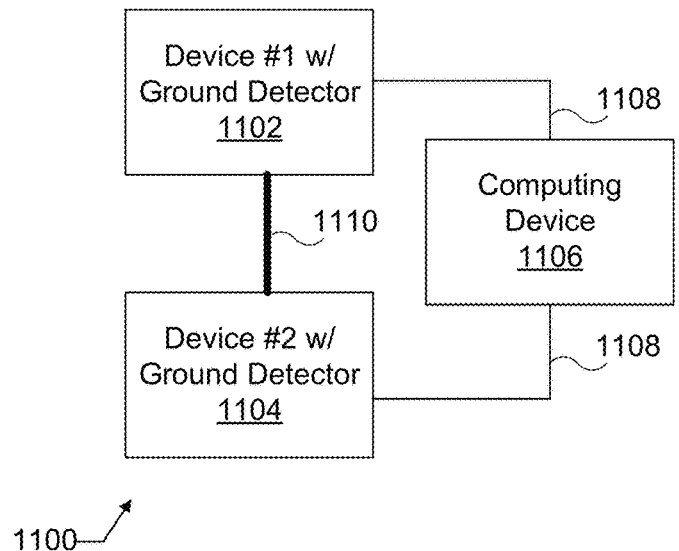
FIG. 11A illustrates a first simplified example of a distributed ground detection system.

FIG. 11A illustrates a first simplified example of a distributed ground detection system. In various aspects, the distributed ground detection system 1100 can include a first device 1102 that includes a ground detector and a second device 1104 that also includes a ground detector. The first device 1102 and the second device 1104 can send and receive electronic signals to and from a computing device 1106 over communication lines 1108. The sent and/or received signals can go between the ground detectors and a computing device 1106 or just between each other if one of the devices is the master. The first device 1102 and the second device 1104 can be connected at various points along power distribution lines 1110. The first device 1102 or the second device 1104 can include any one of a generator controller, a distribution monitor, a motor overload protection device, etc. The ground detector can measure a voltage reading on the power distribution line 1110. A voltage reading can be made at any distributed device that galvanically is connected to the same branch of the system. The voltage reading can be used to determine if a grounded condition exists and if so, a potential location of the grounded condition. The computing device 1106 can receive the voltage readings from the ground detectors (e.g., from the first device 1102 and the second device 1104). Based on the voltage readings the computing device 1106 can alert an operator as to the existence of a grounded condition and if a potential grounded condition exists, a potential location of the grounded condition based at least on the voltage readings.

Figure 11B:
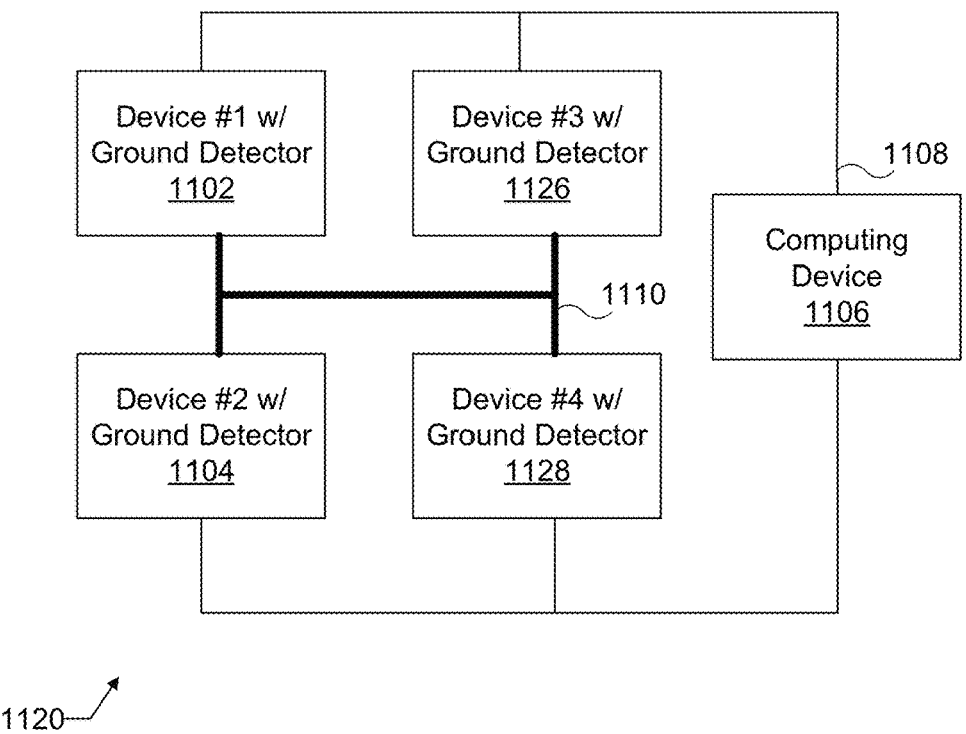
FIG. 11B illustrates a second simplified example of a distributed ground detection system.

FIG. 11B illustrates a second simplified example of a distributed ground detection system. In various aspects, the distributed ground detection system 1120 can include a first device 1102, a second device 1104, a third device 1126, and a fourth device 1128. While four ground detectors are illustrated, some systems can include hundreds of ground detectors. Each of the first device 1102, the second device 1104, the third device 1126 and the fourth device 1128 can include a ground detector. Each of the first device 1102, the second device 1104, the third device 1126, and fourth device 1128 can send and receive electronic signals to and from a computing device 1106 over communication lines 1108. The first device 1102, the second device 1104, the third device 1126, and fourth device 1128 can be connected at various points along power distribution lines 1110. The first device 1102 or the second device 1104 or the third device 1126, or the fourth device 1128 can include any one of a generator controller, a distribution monitor, a motor overload protection device, etc.

The ground detector can measure a voltage reading on the power distribution line 1110. A voltage reading can be made at any distributed device that galvanically is connected to the same branch of the system. The voltage reading can be used to determine if a grounded condition exists and if so, a potential location of the grounded condition. The computing device 1106 can receive the voltage readings from the ground detectors (e.g., from the first device 1102, the second device 1104, the third device 1126, the fourth device 1128). Based on the voltage readings the computing device 1106 can alert an operator as to the existence of a grounded condition and if a potential grounded condition exists, a potential location of the grounded condition based at least on the voltage readings.

Figure 12:
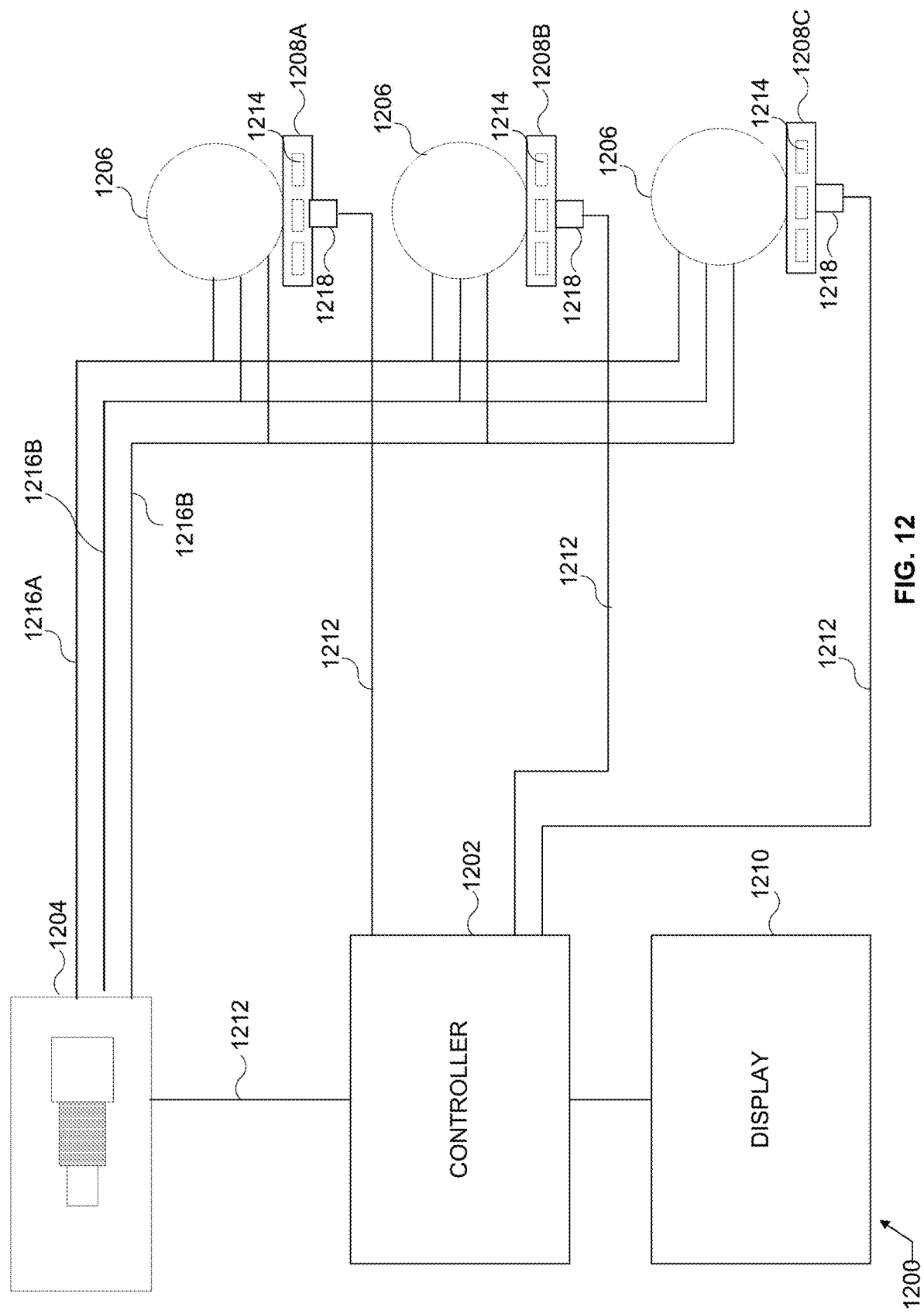
FIG. 12 illustrates an exemplary generator control system diagram.

FIG. 12 illustrates an exemplary generator control system diagram 1200. Generally, those control circuits are isolated from the direct distribution with control power transformers and are handled in the transformer case mentioned. This may be another place that the distributed ground detection could reside, as these sub-circuits can be disconnected from the motor controller protection devices. A power source 1204 (e.g., one or more generators) can provide electrical power to a plurality of loads 1206 (e.g., motors). While three loads 1206 (otherwise known as nodes) are illustrated in FIG. 12, the system and techniques disclosed herein are not so limited. Any number of loads 1206 can be connected to the exemplary ungrounded power distribution system 1200. Various warship applications can have more than fifty nodes. A modern aircraft carrier can have more than a thousand nodes. Higher node counts make locating the ground more precise, using more relative signal strengths measured proportional to the per unit impedance of the wiring, therefore more frames of reference to measure relative distance for triangulation In various embodiments, the power source 1204 can generate multiple phase power (e.g., three phase power) that can be distributed via one or more lines 1216A, 1216B, 1216C. A different phase of power can be distributed via each line.

The power source 1204 can be connected to a controller 1202. The controller 1202 can be one of a programmable logic controller, a computer, or a dedicated microcontroller device. The controller 1202 communicate signals to the power source 1204 via a control line 1212. The controller 1202 can receive information from the power source 1204 that can be used to manage power distribution. The controller 1202 can also be connected to various overload protection devices 1208A, 1208B, 1208C via control lines 1212. The controller 1202 can receive information from the one or more overload protection devices (e.g., a first overload protection device 1208A, a second overload protection device 1208B, and a third overload protection device 1208C). The controller 1202 can send information to be presented on a display 1210 for review by an electrical system operator.

The overload protection devices 1208A, 1208B, 1208C can include one or more detection circuits 1214. The detection circuits 1214 can perform voltage detection to measure voltage at the load 1206; and, the detection circuits 1214 can be used for ground detection. A filter 1218 can be installed between the overload protection devices 1208A, 1208B, 1208C and the controller 1202.

Figure 13:
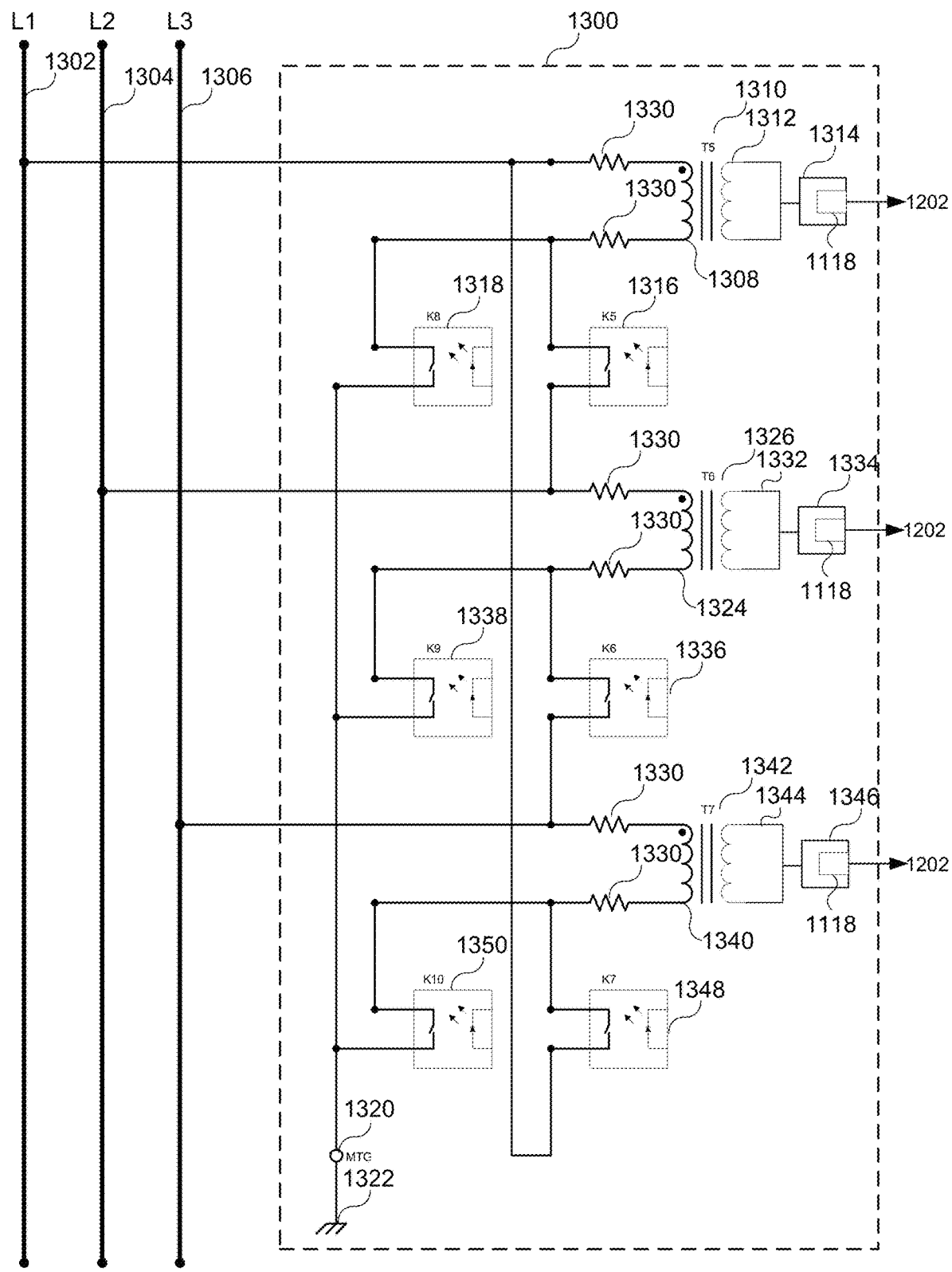
FIG. 13 illustrates an exemplary distributed ground detection circuit using three transformers.

FIG. 13 illustrates an exemplary distributed ground detection circuit 1300 using three transformers. The distributed ground detection circuit 1300 can be connected to a three-phase power source (e.g., line-1 (L1) 1302, line-2 (L2) 1304, and line-3 (L3) 1306). The exemplary ground detection circuit can include a plurality of relays to change from a voltage detection mode of operation to a ground detection mode of operation.

Line-1 (L1) 1302 can be connected to the primary windings 1308 of a first transformer 1310. The secondary windings 1312 of the first transformer 1310 can be connected to a first detection circuit 1314. The primary windings 1308 of the first transformer can also be connected to a first relay (K5) 1316 and a second relay (K8) 1318. The relays illustrated in FIG. 13 can be cycled as a complete group.

If energized, the first relay (K5) 1316 can connect the primary windings 1308 of the first transformer 1310 to the primary windings 1324 of a second transformer 1326. The first relay (K5) 1316 can be energized in the voltage detection mode. In the voltage detection mode, the line-1 (L1) 1302 would be connected to the line-2 (L2) 1304 through the primary windings of the first transformer 1310. This would be part of a delta configuration of the ground detection circuit 1300. In the voltage detection mode, the first detection circuit would measure a voltage of the line-1 (L1) 1302. The measured voltage can be sent to a controller 1202. When relays 1318, 1338, and 1350 are off or open, and relays 1316, 1336, and 1348 are closed or on, the transformers are measuring line-to-line. When reversing the relays, we are measuring line-to-ground.

If energized, the second relay (K8) 1318 can be connected to a common point 1320. The common point can be connected to ground 1322. The second relay (K8) 1318 would be energized in ground-detection mode. This would be part of a wye configuration of the ground detection circuit 1300. In the ground detection mode, the first detection circuit 1314 would measure a voltage for determining if a ground exists, and if so a value to determine a location of the ground.

One or more resistors 1330 can be connected prior to and/or after the primary windings 1308 of the first transformer 1310.

Line-2 (L2) 1304 can be connected to the primary windings 1324 of a second transformer 1326. The secondary windings 1332 of the second transformer 1326 can be connected to a second detection circuit 1334. The primary windings 1324 of the second transformer can also be connected to a first relay (K6) 1336 and a second relay (K9) 1338.

If energized, the first relay (K6) 1336 can connect the primary windings 1324 of the second transformer 1326 to the primary windings 1340 of a third transformer 1342. The first relay (K6) 1336 can be energized in the voltage detection mode. In the voltage detection mode, the Line-2 (L2) 1304 would be connected to the Line-3 (L3) 1306 through the primary windings of the second transformer 1326. This would be part of a delta configuration of the ground detection circuit 1300. In the voltage detection mode, the second detection circuit 1334 would measure a voltage of the Line-2 (L2) 1304. The measured voltage can be sent to a controller 1202.

If energized, the second relay (K9) 1338 can be connected to a common point 1320. The common point can be connected to ground 1322. The second relay (K9) 1338 would be energized in ground-detection mode. This would be part of a wye configuration of the ground detection circuit 1300. In the ground detection mode, the second detection circuit 1334 would measure a voltage for determining if a ground exists, and if so a value to determine a location of the ground.

One or more resistors 1330 can be connected prior to and/or after the primary windings 1324 of the second transformer 1326.

Line-3 (L3) 1306 can be connected to the primary windings 1340 of a third transformer 1342. The secondary windings 1344 of the third transformer 1342 can be connected to a third detection circuit 1346. The primary windings 1340 of the third transformer 1342 can also be connected to a first relay (K7) 1348 and a second relay (K10) 1350.

If energized, the first relay (K7) 1348 can connect the primary windings 1340 of the third transformer 1342 to the primary windings 1308 of the first transformer 1310. The first relay (K7) 1348 can be energized in the voltage detection mode. In the voltage detection mode, Line-3 (L3) 1306 would be connected to Line-1 (L1) 1302 through the primary windings of the third transformer 1342. This would be part of a delta configuration of the ground detection circuit 1300. In the voltage detection mode, the first detection circuit would measure a voltage of Line-3 (L3) 1306. The measured voltage can be sent to a controller 1202.

If energized, the second relay (K10) 1350 can be connected to a common point 1320. The common point can be connected to ground 1322. The second relay (K10) 1350 would be energized in ground-detection mode. This would be part of a wye configuration of the ground detection circuit 1300. In the ground detection mode, the third detection circuit 1346 would measure a voltage for determining if a ground exists, and if so a value to determine a location of the ground.

One or more resistors 1330 can be connected prior to and/or after the primary windings 1340 of the third transformer 1342.

Therefore, in a normal, voltage detection mode the first relay (K5) 1314, the first relay (K6) 1336, and the first relay (K7) 1348 would be energized, closing the electrical connections to link transformers from A-to-B, B-to-C, and C-to-A. The second relay (K8) 1312, the second relay (K9) 1338, and the second relay (K10) 1350 would be de-energized (open) in the voltage detection mode.

To activate a ground detection mode, the first relay (K5) 1314, the first relay (K6) 1336, and the first relay (K7) 1348 would be de-energized (open). The second relay (K8) 1312, the second relay (K9) 1338, and the second relay (K10) 1350 would be energized (closed) in the ground detection mode. Ground detection mode can be activated manually by a controller. In various embodiments, ground detection mode can be activated automatically at periodic intervals (e.g., every 10 minutes).

If the ground detection circuit 1300 was activated in the ground detection mode with a ground in one of the lines, one or more of the first detection circuit 1314, the second detection circuit 1334 and the third detection circuit 1346 would register a representative voltage signal. The representative voltage signal would be proportional to the distance from that transformer through all the cabling and wiring, and whatever kind of insulation is left on the wiring in the vicinity of the ground.

The voltage output of the transformer would be proportional to the voltage from primary to ground. The voltage signal can be passed through a filter 1218, as illustrated in FIG. 12, to filter or otherwise process the signal. Once the signal is filtered, the signal can be passed through an analog to digital converter to obtain a count value that is proportional to that voltage level for the signal. In various embodiments, the count value can be sent to the controller 1202.

In the ground detection mode, the voltage of the transformer of a grounded circuit will drop down to a lower voltage while the other two transformer voltages may remain high. For example, if the first transformer 1310 is closest to the ground location, the first detection circuit 1314 can have a first proportional signal that is down at ~25% or 30% of what the maximum line voltage should be. In various embodiments, the voltage difference can be zero volts. Any drop in voltage could be a result of grounding. The proportions of the drop are the crux of the argument for pinpointing the ground with multiple detectors. The threshold for that drop would be system dependent.

If looking at the drop in only one detector location, the line characteristics must be known, as stated above. There can be two methods for ground detection (e.g., one detector with known system and multiple detectors with unknown system).

The first proportional signal corresponds to a length of cabling that is between where that transformer is detecting and where the actual ground is located in the line. The actual location cannot be determined by that distance alone. In order to determine a location, at least three measurements are generally taken, which could provide multiple proportional signals, each representative of a distance from the corresponding transformer. For example, one signal can represent 10 feet away, another can represent 25 feet away, and a third can represent 50 feet away. This information can be triangulated to determine a precise location of the ground.

According to this method, the length and impedance of the wiring on the system would be a known quantity. A processor can be used to convert the count value to a precise distance from each of the transformers.

Figure 14:
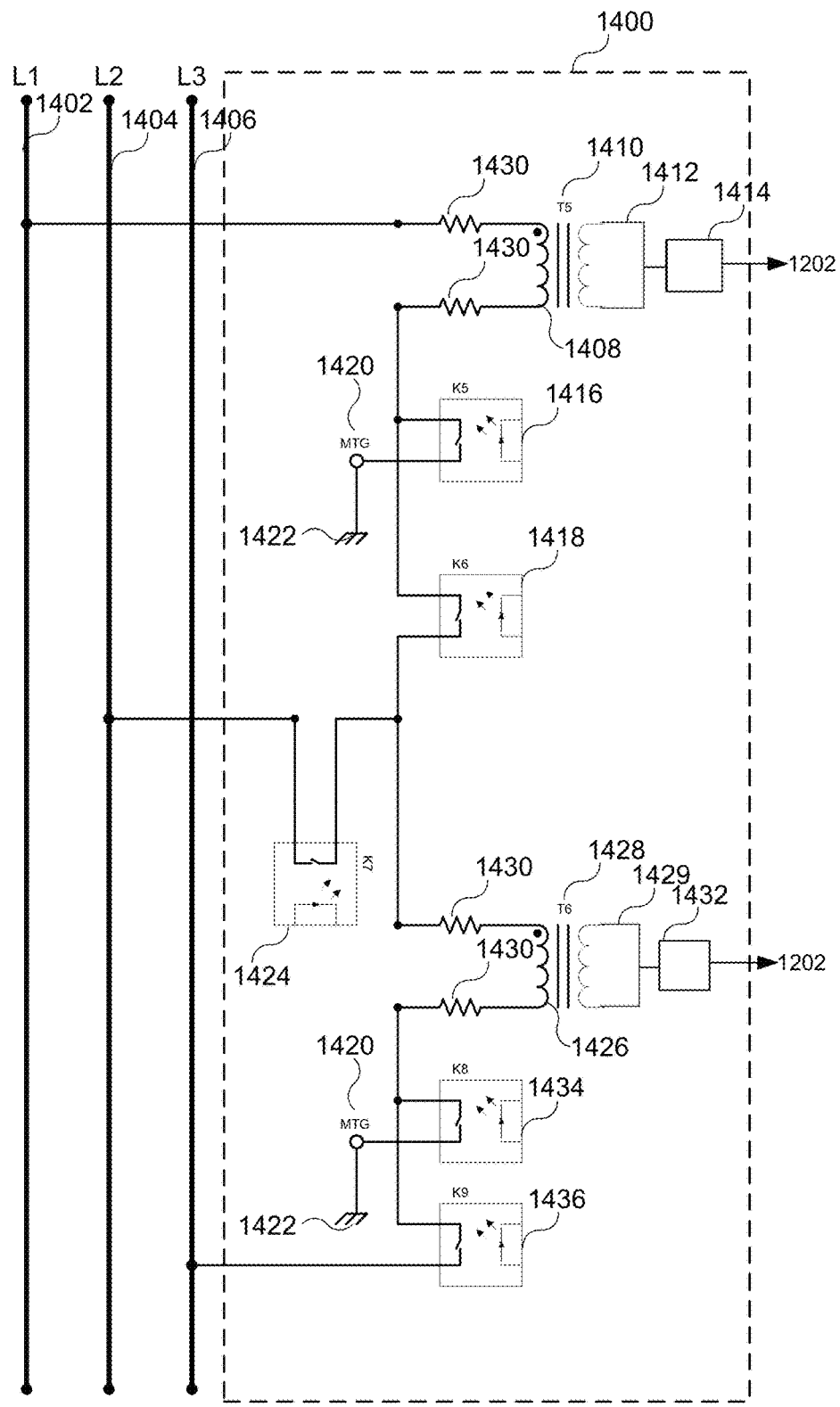
FIG. 14 illustrates an exemplary distributed ground detection circuit using two transformers.

FIG. 14 illustrates a second, exemplary distributed ground detection circuit 1400 using only two transformers. The distributed ground detection circuit 1400 illustrated in FIG. 14 shares common elements with the distributed ground detection circuit 1300 illustrated in FIG. 13 and the description provided in relation to the distributed ground detection circuit 1300 is applicable to the distributed ground detection circuit 1400 as appropriate. The distributed ground detection circuit 1400 can be connected to a three-phase power source (e.g., line-1 (L1) 1402, line-2 (L2) 1404, and line-3 (L3) 1406). The exemplary ground detection circuit can include a plurality of relays to change from a voltage detection mode of operation to a ground detection mode of operation.

Unlike the bank change from line-to-line to line-to-ground by switching all 6 relays at once as done for the previous embodiment in FIG. 13, this configuration can have a sequence of connections/disconnections to switch from measuring line-to-line to measuring line-to-ground. In one sequence, relay 1416 and relay 1434 can be off with relay 1418, relay 1424, and relay 1436 can be on to connect for normal line-to-line voltage measurements. In a second sequence relay 1436, relay 1418, and relay 1416 can be on with relay 1424 and relay 1434 can be off to connect for measuring line-1 (L1) 1402 to ground and line-3 (L3) 1406 to ground voltages. In a third configuration, relay 1424 and relay 1434 can be on with relay 1436 and relay 1418 can be off to connect for measuring line-2 (L2) 1404 to ground.

The line-1 (L1) 1402 can be connected to a primary windings 1308 of a first transformer 1410. The secondary windings 1412 of the first transformer 1410 can be connected to a first detection circuit 1414. The primary windings 1408 of the first transformer 1410 can also be connected to a first relay (K5) 1416 and a second relay (K8) 1418.

If energized, the first relay (K5) 1416 can connect the primary windings 1408 to a common point 1420. The common point can be connected to ground 1422. The first relay (K5) 1416 would be energized in ground-detection mode. This would be part of a wye configuration of the ground detection circuit 1400. In the ground detection mode, the first detection circuit 1414 would measure a voltage for determining if a ground exists, and if so a value to determine a location of the ground.

If energized, the second relay (K6) 1418 can connect the primary windings 1408 of the first transformer 1410 to the primary windings 1426 of a second transformer 1428. The second relay (K6) 1418 can be energized in the voltage detection mode. In the voltage detection mode, the Line-1 (L1) 1402 would be connected to the Line-2 (L2) 1404 through the primary windings of the first transformer 1410. This would be part of a delta configuration of the ground detection circuit 1400. In the voltage detection mode, the first detection circuit would measure a voltage of the Line-1 (L1) 1402. The measured voltage can be sent to a controller 1202.

One or more resistors 1430 can be connected prior to and/or after the primary windings 1408 of the first transformer 1410.

If a third relay (K7) 1424 is energized (closed), the line-2 (L2) 1404 can be connected to the primary windings 1427 of a second transformer 1428. The secondary windings 1429 of the second transformer 1428 can be connected to a second detection circuit 1432. The primary windings 1426 of the second transformer 1428 can also be connected to a first relay (K8) 1434 and a second relay (K9) 1436.

If energized, the first relay (K8) 1434 can connect the primary windings 1408 to a common point 1420. The common point can be connected to ground 1422. The first relay (K8) 1434 would be energized in ground-detection mode. This would be part of a wye configuration of the ground detection circuit 1400. In the ground detection mode, the first detection circuit 1432 would measure a voltage for determining if a ground exists, and if so a value to determine a location of the ground. If the second replay (K9) 1436 is also energized (closed), the Line-3 (L3) 1406 is also connected to the common point 1420.

If the second relay (K9) 1436 is energized (closed) and the first relay (K8) 1434 is de-energized (open), the primary windings 1426 of the second transformer 1428 to Line-3 (L3) 1406. The second relay (K9) 1436 can be energized in the voltage detection mode. In the voltage detection mode, the Line-2 (L2) 1402 would be connected to the Line-3 (L3) 1406. This would be part of a delta configuration of the ground detection circuit 1400. In the voltage detection mode, the first detection circuit would measure a voltage of the Line-2 (L2) 1404. The measured voltage can be sent to a controller 1202.

One or more resistors 1430 can be connected prior to and/or after the primary windings 1426 of the second transformer 1428.

The Line-1 (L1) 1402 can be connected to the Line-3 (L3) 1406 if the second relay (K6) 1418 is energized (closed) and the second relay (K9) 1436 is energized (closed) with the remaining relays de-energized (open).

For voltage measurements, take the potential difference such as the following equation:

$$V_{ab} + V_{cb} = V_{ac}.$$

Vector math can be used as the voltage can be a rotating value from a three-phase generator. In various embodiments, the voltage difference can be represented by $V_{L1-L2}$ instead. When the transformers are tied to an artificial wye tie point, the voltage can be read as $V_{L1-N}$ or $V_{an}$.

If the second, exemplary distributed ground detection circuit 1400 is in voltage detection mode, second relay (K6) 1418, third relay (K7) 1424, and second relay (K9) 1436 are energized (closed), and first relay (K5) 1416 and first relay (K8) 1434 are de-energized (open). In this way, all three phases are connected in Delta configuration. The first detection circuit 1414 can provide a measurement of the line-1 (L1) 1402 voltage. The first detection circuit 1414 can send the voltage measurement to a controller 1202.

The second detection circuit 1432 can provide a measurement of line-2 (L2) 1404 voltage if third relay (K7) 1424 is energized (closed) and the second relay (K9) 1436 is de-energized (open). The second detection circuit 1432 can provide a measurement of line-3 (L3) 1406 voltage if third relay (K7) 1424 is de-energized (open) and the second relay (K9) 1436 is energized (closed). The second detection circuit 1432 can send the voltage measurement to the controller 1202.

If the second, exemplary distributed ground detection circuit 1400 is in ground detection mode, first relay (K5) 1416, third relay (K7) 1424, first relay (K8) 1434, are energized (closed). In this way, all three phases are connected in a wye configuration to a ground point.

Therefore, second, exemplary distributed ground detection circuit 1400 can provide the same functionality with fewer components than the distributed ground detection circuit 1400 described in FIG. 14.

Figure 15:
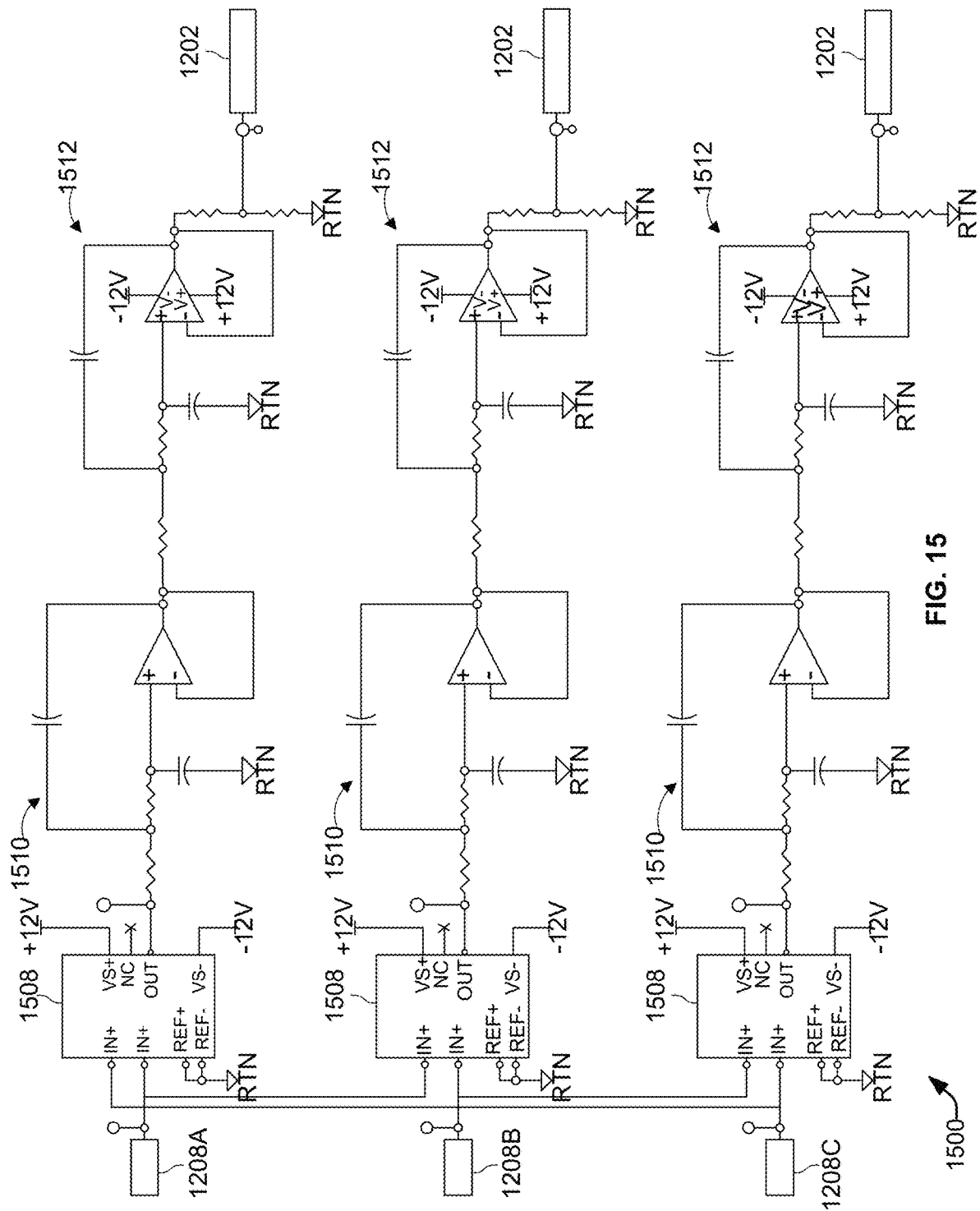
FIG. 15 illustrates a filtering circuit.

FIG. 15 illustrates a filtering circuit 1500. The filtering circuit 1500 can be part of the filter 1218 as shown in FIG. 12. Noise filtering can often occur when measuring and converting to digital signals. The filtering circuit 1500 can receive the electrical signals from the overload protection devices 1208A, 1208B, 1208C as shown in FIG. 12. A first overload protection device 1208A can provide a first signal from phase A. A second overload protection device 1208B can provide a second signal from phase B. A third overload protection device 1208C can provide a third signal from phase C. The filtering circuit removes or "filters out" a specified range of frequency components of the signals (e.g., noise).

The filtering circuit 1500 can include a differential amplifier 1508. The differential amplifier 1508 can include an operational amplifier and a resistor network. The differential amplifier 1508 can have a very high input, common-mode voltage range (e.g., an AD629 device). The differential amplifier 1508 can allow for accurately measuring differential signals in the presence of high common-mode voltages (e.g., up to ±270 volts). To achieve high common-mode voltage range, an internal resistor divider attenuates the non-inverting signal by some factor (e.g., 20). Other internal resistors restore the gain to provide a differential unity of gain.

The filtering circuit 1500 can include a first low pass filter 1510 that passes low frequency signals and blocks high frequency signals. In various embodiments, the first low pass filter 1510 can utilize Sallen-Key topology. Sallen-Key can be only one of many types of filters that can and are employed for these systems.

The filtering circuit 1500 can include a second low pass filter 1512 that passes low frequency signals and blocks high frequency signals. In various embodiments, the second low pass filter 1512 can be connected in series with the first low pass filter 1510. In various embodiments, the first low pass filter 1512 can utilize Sallen-Key topology. The output of the second low pass filter 1512 can be the controller 1202 as illustrated in FIG. 12.

Figure 16:
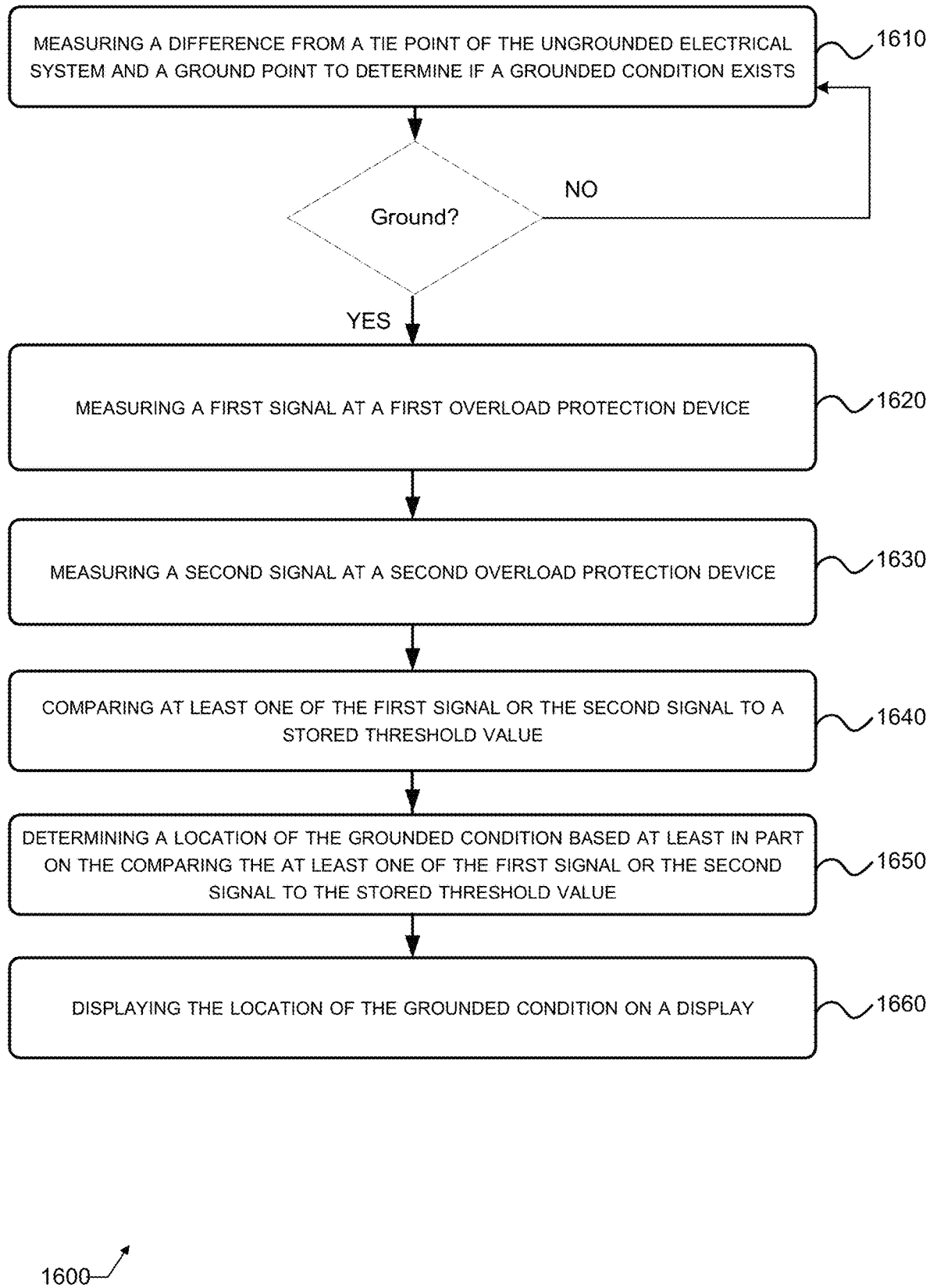
FIG. 16 illustrates a first exemplary process for detecting a ground condition in an electrical system.

FIG. 16 illustrates a flow chart of a first example process for detecting a ground condition in an electrical system. In some implementations, one or more process blocks of FIG. 16 can be performed by a computing device. In some implementations, one or more process blocks of FIG. 16 can be performed by another device or a group of devices separate from or including the computing device.

The method can include measuring a difference from a tie point of the ungrounded electrical system and a ground point to determine if a grounded condition exists (1610). A switch or electronic relay can connect the primary windings of transformers connected to each phase of an electrical power source to a ground. In various aspects, a voltage reading can be made at any distributed device that galvanically is connected to the same branch of the system, like three generator controllers on the main bus. In various embodiments, the method can include activating a plurality of relays of the first overload protection device or the second overload protection device to change a configuration of the ungrounded electrical system from a delta configuration to a wye configuration.

When one phase is grounded, the phase-to-ground voltage of the grounded phase decreases toward zero and the phase-to-ground voltages of the other phases increase. In high-resistance grounded systems, a current-sensitive relay in the grounding resistor circuit may also be used to measure the very small fault current.

For example, for the three-transformer configuration as described for FIG. 13, if second relay (K8) 1312, second relay (K9) 1338, and second relay (K10) 1350 are energized (closed) Line-1 (L1) 1302, Line-2 (L2) 1304, and Line-3 (L3) 1306 will be tied in a wye configuration.

The method can include measuring a first signal at a first overload protection device (1620). In various embodiments, the first signal can be measured in volts. The first signal can be measured from any one of the first detection circuit 1314, the second detection circuit 1334, and the third detection circuit 1346. The first signal can be passed through a filter 1218. In various embodiments, the first signal can be converted from an analog signal to a digital signal through an analog digital converter. The first signal can be sent to the controller 1202.

The method can include measuring a second signal at a second overload protection device (1630). In various embodiments, the second signal can be measured in volts. The second signal can be measured from one of the first detection circuit 1314, the second detection circuit 1334, and the third detection circuit 1346 that does not provide the first signal. The second signal can be passed through a filter 1218. In various embodiments, the second signal can be converted from an analog signal to a digital signal through an analog digital converter. The second signal can be sent to the controller 1202.

In various embodiments, the method can include measuring a third signal at a third overload protection device. In various embodiments, the third signal can be measured in volts. The third signal can be passed through a filter 1218. In various embodiments, the third signal can be converted from an analog signal to a digital signal through an analog digital converter. The third signal can be sent to the controller 1202.

The method can include comparing at least one of the first signal or the second signal to a stored threshold value (1640). The threshold values can be used to determine if a ground fault likely exists on the line.

The method can include determining a location of the grounded condition based at least in part on comparing at least one of the first signal or the second signal to the stored threshold value (1650). In various embodiments, the determined location of the grounded condition is based at least in part on a length and an impedance of electrical circuit wiring of the ungrounded electrical system.

In various embodiments, the method can include filtering the signal from the overload protection devices prior to being sent to the controller. The filtering can be accomplished using a low-pass filter to filter out high frequency noise.

The method can include displaying the location of the grounded condition on a display (1660). The location can be displayed using a digital representation (e.g., a map) of the power distribution system. In various embodiments, the ground location can be displayed as a pinpoint location. In various embodiments, the ground location can be depicted as a general area. The location can be displayed as a distance from various components. In additional to a location of a ground, the display can present voltage levels, current levels, what the runtime status of the motor, and various temperature measurements.

In various embodiments, the method can include activating the plurality of relays of the first overload protection device or the second overload protection device to change the configuration of the ungrounded electrical system from the wye configuration to the delta configuration. In this way, the overload protection devices change from ground fault detection to voltage monitoring.

Process 1600 can include additional implementations, such as any single implementation or any combination of implementations described below and/or in connection with one or more other processes described elsewhere herein. It should be appreciated that the specific steps illustrated in FIG. 16 provide particular techniques for detection of ground faults in ungrounded electrical systems according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 16 can include multiple sub-steps that can be performed in various sequences as appropriate to the individual step. Furthermore, additional steps can be added or removed depending on the particular applications. One of ordinary skill in the art would recognize many variations, modifications, and alternatives.

Figure 17:
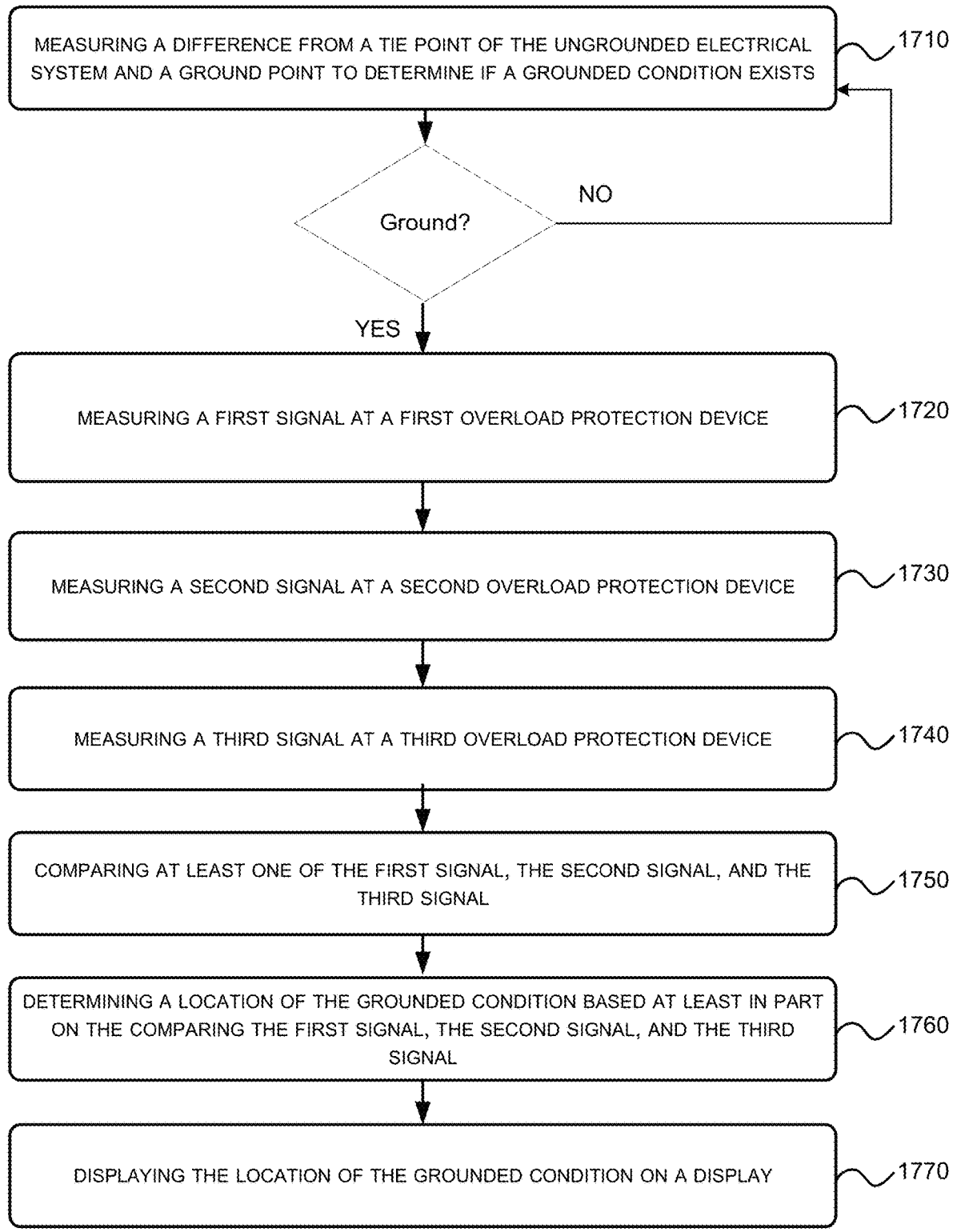
FIG. 17 illustrates a second exemplary process for detecting a ground condition in an electrical system.

FIG. 17 illustrates a flow chart of a second example process for detecting a ground condition in an electrical system. In some implementations, one or more process blocks of FIG. 17 can be performed by a computing device. In some implementations, one or more process blocks of FIG. 17 can be performed by another device or a group of devices separate from or including the computing device.

The method can include measuring a difference from a tie point of the ungrounded electrical system and a ground point to determine if a grounded condition exists (1710). A switch or electronic relay can connect the primary windings of transformers connected to each phase of an electrical power source to a ground. In various embodiments, the method can include activating a plurality of relays of the first overload protection device or the second overload protection device to change a configuration of the ungrounded electrical system from a delta configuration to a wye configuration.

When one phase is grounded, the phase-to-ground voltage of the grounded phase decreases toward zero and the phase-to-ground voltages of the other phases increase. In high-resistance grounded systems, a current-sensitive relay in the grounding resistor circuit may also be used to measure the very small fault current.

For example, for the three-transformer configuration as described for FIG. 13, if second relay (K8) 1312, second relay (K9) 1338, and second relay (K10) 1350 are energized (closed) Line-1 (L1) 1302, Line-2 (L2) 1304, and Line-3 (L3) 1306 will be tied in a wye configuration.

The method can include measuring a first signal at a first overload protection device (1720). In various embodiments, the first signal can be measured in volts. The first signal can be measured from any one of the first detection circuit 1314, the second detection circuit 1334, and the third detection circuit 1346. The first signal can be passed through a filter 1218. In various embodiments, the first signal can be converted from an analog signal to a digital signal through an analog digital converter. The first signal can be sent to the controller 1202.

The method can include measuring a second signal at a second overload protection device (1730). In various embodiments, the second signal can be measured in volts. The second signal can be measured from one of the first detection circuit 1314, the second detection circuit 1334, and the third detection circuit 1346 that does not provide the first signal. The second signal can be passed through a filter 1218. In various embodiments, the second signal can be converted from an analog signal to a digital signal through an analog digital converter. The second signal can be sent to the controller 1202.

In various embodiments, the method can include measuring a third signal at a third overload protection device (1740). In various embodiments, the third signal can be measured in volts. The third signal can be passed through a filter 1218. In various embodiments, the third signal can be converted from an analog signal to a digital signal through an analog digital converter. The third signal can be sent to the controller 1202.

The method can include comparing the first signal, the second signal, and a third signal (1750). The threshold values can be used to determine if a ground fault likely exists on the line.

The method can include determining a location of the grounded condition based at least in part on comparing the first signal, the second signal, and the third signal (1760). In various embodiments, the method can provide relativistic localization of the ground by comparing the values of three or more signal values to determine which one of the signals showed the strongest ground (e.g., a lowest voltage measured on the collapsed line). This approach does not require the measuring and setup of the entire system of cables attached to the system and has the most flexibility and tolerance to repairs. In various embodiments, the method can include filtering the signal from the overload protection devices prior to being sent to the controller. The filtering can be accomplished using a low-pass filter to filter out high frequency noise.

The method can include displaying the location of the grounded condition on a display (1770). The location can be displayed using a digital representation (e.g., a map) of the power distribution system. In various embodiments, the ground location can be displayed as a pinpoint location. In various embodiments, the ground location can be depicted as a general area. The location can be displayed as a distance from various components. In additional to a location of a ground, the display can present voltage levels, current levels, what the runtime status of the motor, and various temperature measurements.

In various embodiments, the method can include activating the plurality of relays of the first overload protection device or the second overload protection device to change the configuration of the ungrounded electrical system from the wye configuration to the delta configuration. In this way, the overload protection devices change from ground fault detection to voltage monitoring.

Process 1700 can include additional implementations, such as any single implementation or any combination of implementations described below and/or in connection with one or more other processes described elsewhere herein. It should be appreciated that the specific steps illustrated in FIG. 17 provide particular techniques for detection of ground faults in ungrounded electrical systems according to various embodiments of the present disclosure. Other sequences of steps can also be performed according to alternative embodiments. For example, alternative embodiments of the present disclosure can perform the steps outlined above in a different order. Moreover, the individual steps illustrated in FIG. 17 can include multiple sub-steps that can be performed in various sequences as appropriate to the individual step. Furthermore, additional steps can be added or removed depending on the particular applications. One of ordinary skill in the art would recognize many variations, modifications, and alternatives.

Figure 18:
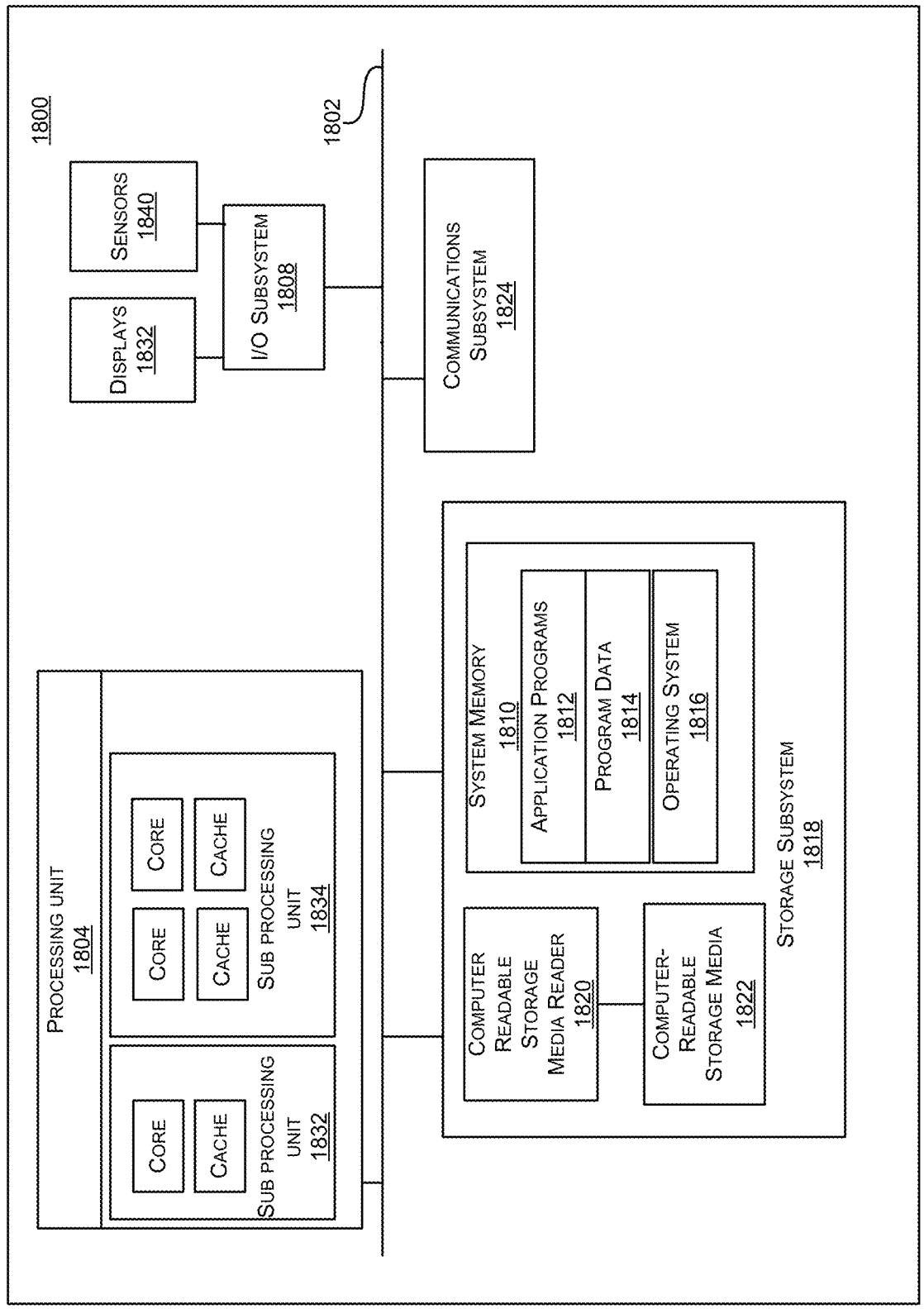
FIG. 18 illustrates a computer system, in which various embodiments described herein can be implemented Like reference, symbols in the various drawings indicate like elements, in accordance with certain example implementations. In addition, multiple instances of an element may be indicated by following a first number for the element with a letter or a hyphen and a second number.

Each of the embodiments disclosed herein can be implemented in a special-purpose computer system. FIG. 18 illustrates a computer system 1800, in which various embodiments described herein can be implemented. The system 1800 can be used to implement any of the computer systems described above. As shown in the figure, computer system 1800 includes a processing unit 1804 that communicates with a number of peripheral subsystems via a bus subsystem 1802. These peripheral subsystems can include an input/output (I/O) subsystem 1808, a storage subsystem 1818 and a communications subsystem 1824. The storage subsystem 1818 can include a tangible computer-readable storage media 1822 and a system memory 1810.

Bus subsystem 1802 provides a mechanism for letting the various components and subsystems of computer system 1800 communicate with each other as intended. Aside from just the bus subsystem 1802 having varying implementations, the system 1800 can have varying implementations of isolation with or without the transformers as shown; however, the method only holds through a section of the bus system 1802 that is galvanically connected. Fewer transformers would just mean more of the system 1800 would be connected together and more detecting devices would be available to provide data to locate the ground. Although bus subsystem 1802 is shown schematically as a single bus, alternative embodiments of the bus subsystem can utilize multiple buses. Bus subsystem 1802 can be any of several types of bus structures including a memory bus or memory controller, a peripheral bus, and a local bus using any of a variety of bus architectures. For example, such architectures can include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1804, which can be implemented as one or more integrated circuits (e.g., a conventional microprocessor or microcontroller), controls the operation of computer system 1800. One or more processors can be included in processing unit 1804. These processors can include single core or multicore processors. In certain embodiments, processing unit 1804 can be implemented as one or more independent processing units and/or sub-processing unit 1834, 1838 with single or multicore processors included in each processing unit. In other embodiments, processing unit 1804 can also be implemented as a quad-core processing unit formed by integrating two dual-core processors into a single chip.

In various embodiments, processing unit 1804 can execute a variety of programs in response to program code and can maintain multiple concurrently executing programs or processes. At any given time, some or all of the program code to be executed can be resident in processing unit 1804 and/or in storage subsystem 1818. Through suitable programming, processing unit 1804 can provide various functionalities described above. Computer system 1800 can include a digital signal processor (DSP), a special-purpose processor, and application specific integrated-circuit (ASIC), and/or the like.

I/O subsystem 1808 can include user interface input devices and user interface output devices. User interface input devices can include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices.

The system 1800 can include one or more sensors 1840. The system 1800 can include one or more displays 1832.

Computer system 1800 can comprise a storage subsystem 1818 that comprises software elements, shown as being currently located within a system memory 1810. System memory 1810 can store program instructions that are loadable and executable on processing unit 1804, as well as data generated during the execution of these programs.

Depending on the configuration and type of computer system 1800, system memory 1810 can be volatile (such as random access memory (RAM)) and/or non-volatile (such as read-only memory (ROM), flash memory, etc.) The RAM typically contains data and/or program modules that are immediately accessible to and/or presently being operated and executed by processing unit 1804. In some implementations, system memory 1810 can include multiple different types of memory, such as static random access memory (SRAM) or dynamic random access memory (DRAM). In some implementations, a basic input/output system (BIOS), containing the basic routines that help to transfer information between elements within computer system 1800, such as during start-up, can typically be stored in the ROM. By way of example, and not limitation, system memory 1810 also illustrates application programs 1812, which can include client applications, web browsers, mid-tier applications, relational database management systems (RDBMS), etc., program data 1814, and an operating system 1816. By way of example, operating system 1816 can include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® operating system (OS), and the like) and/or mobile operating systems such as iOS, Windows® Phone, Android® OS, BlackBerry® 10 OS, and Palm® OS operating systems. By way of example, operating system 1816 can include a custom real-time operating systems (RTOS).

Storage subsystem 1818 can also provide a tangible computer-readable storage medium for storing the basic programming and data constructs that provide the functionality of some embodiments. Software (programs, code modules, instructions) that when executed by a processor provide the functionality described above can be stored in storage subsystem 1818. These software modules or instructions can be executed by processing unit 1804. Storage subsystem 1818 can also provide a repository for storing data used in accordance with the present disclosure.

Storage subsystem 1818 can also include a computer-readable storage media reader 1820 that can further be connected to computer-readable storage media 1822. Together and, optionally, in combination with system memory 1810, computer-readable storage media 1822 can comprehensively represent remote, local, fixed, and/or removable storage devices plus storage media for temporarily and/or more permanently containing, storing, transmitting, and retrieving computer-readable information.

Computer-readable storage media 1822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, compact disc read only memory (CD-ROM), digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1800.

By way of example, computer-readable storage media 1822 can include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1822 can include, but is not limited to, Zip® drives, flash memory cards, universal serial bus (USB) flash drives, secure digital (SD) cards, DVD disks, digital video tape, and the like. Computer-readable storage media 1822 can also include, solid-state drives (SSD) based on non-volatile memory such as flash-memory based SSD, enterprise flash drives, solid state ROM, and the like, SSDs based on volatile memory such as solid state RAM, dynamic RAM, static RAM, dynamic random-access memory (DRAM)-based SSD, magnetoresistive RAM (MRAM) SSD, ferroelectric random-access memory (FRAM), and hybrid SSD that use a combination of DRAM and flash memory based SSD. The disk drives and their associated computer-readable media can provide non-volatile storage of computer-readable instructions, data structures, program modules, and other data for computer system 1800.

Communications subsystem 1824 provides an interface to other computer systems and networks. Communications subsystem 1824 serves as an interface for receiving data from and transmitting data to other systems from computer system 1800. For example, communications subsystem 1824 can enable computer system 1800 to connect to one or more devices via the Internet. In some embodiments communications subsystem 1824 can include radio frequency (RF) transceiver components for accessing wireless voice and/or data networks (e.g., using cellular telephone technology, advanced data network technology, such as 3G, 4G or EDGE (enhanced data rates for global evolution), Wi-Fi (Institute of Electrical and Electronics Engineers (IEEE) 802.11 family standards, or other mobile communication technologies, or any combination thereof), global positioning system (GPS) receiver components, and/or other components. In some embodiments communications subsystem 1824 can provide wired network connectivity (e.g., Ethernet) in addition to or instead of a wireless interface.

In some embodiments, communications subsystem 1824 can also receive input communication in the form of structured and/or unstructured data feeds 1826, event streams 1828, event updates 1830, and the like on behalf of one or more users who can use computer system 1800.

Due to the ever-changing nature of computers and networks, the description of computer system 1800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, can be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present disclosure. It will be apparent, however, to one skilled in the art that embodiments of the present disclosure can be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes can be made in the function and arrangement of elements without departing from the spirit and scope of the disclosure as set forth in the appended claims.

Specific details are given in the foregoing description to provide a thorough understanding of the embodiments. However, it will be understood by one of ordinary skill in the art that the embodiments can be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations can be re-arranged. A process is terminated when its operations are completed, but could have additional steps not included in a figure. A process can correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc., can be passed, forwarded, or transmitted via any suitable means including memory sharing, message passing, token passing, network transmission, etc.

Furthermore, embodiments can be implemented by hardware, software, firmware, middleware, microcode, hardware description languages, or any combination thereof. When implemented in software, firmware, middleware or microcode, the program code or code segments to perform the necessary tasks can be stored in a machine-readable medium. A processor(s) can perform the necessary tasks.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used below, any reference to a series of examples is to be understood as a reference to each of those examples disjunctively (e.g., "Examples 1-4" is to be understood as "Examples 1, 2, 3, or 4").

Example 1 is an ungrounded power distribution system with distributed ground detection, comprising: an electrical circuit comprising at least a first ground detector device and a second ground detector device, each the first ground detector device and the second ground detector device comprising a voltage ground detection circuit configured to measure ground signal strengths; a controller comprising at least one processor configured to read a first signal strength at the first ground detector device and a second signal strength at the second ground detector device, wherein the controller is configured to determine a ground location based at least in part on the first signal strength at the first ground detector device and the second signal strength at the second ground detector device; a communication network connecting the first ground detector device and the second ground detector device with the controller; and a display configured to present the ground location in the ungrounded power distribution system.

Example 2 is the ungrounded power distribution system of example(s) 1, further comprising a switch to transition the voltage ground detection circuit from a voltage detection mode to a ground detection mode.

Example 3 is the ungrounded power distribution system of example(s) 2, wherein the switch is configured to activate a plurality of relays that change a delta configuration of the electrical circuit to a wye configuration of the electrical circuit.

Example 4 is the ungrounded power distribution system of example(s) 1, wherein the ground location is determined based at least in part on a length and an impedance of the electrical circuit wiring.

Example 5 is the ungrounded power distribution system of example(s) 1, further comprising a filter coupled to the voltage ground detection circuit.

Example 6 is the ungrounded power distribution system of example(s) 1, further comprising one or more transformers, wherein the one or more transformers connect each phase of a plurality of phase wires of the ungrounded power distribution system to a common wye tie point.

Example 7 is the ungrounded power distribution system of example(s) 1, wherein the ground signal strengths are measured in volts.

Example 8 is an overload protection device comprising: a first transformer comprising a first primary-winding connected to a first phase of an electrical power source and a first secondary-winding connected to a first voltage detecting circuit and a communication circuit, the first voltage detecting circuit configured to measure a first signal strength of the first secondary-winding; a second transformer comprising a second primary-winding connected to a second phase of the electrical power source and a second secondary-winding connected to a second voltage detecting circuit and the communication circuit, the second voltage detecting circuit configured to measure a second signal strength of the second secondary-winding; a third transformer comprising a third primary-winding connected to a third phase of the electrical power source and a third secondary-winding connected to a third voltage detecting circuit and the communication circuit, the third voltage detecting circuit configured to measure a third signal strength of the third secondary-winding; a first switching element configured to selectively connect the first primary-winding to the second primary-winding in a voltage detection mode; a second switching element configured to selectively connect the first primary-winding to a ground in a ground detection mode; a third switching element configured to selectively connect the second primary-winding to the third primary-winding in the voltage detection mode; a fourth switching element configured to selectively connect the second primary-winding to the ground in the ground detection mode; a fifth switching element configured to selectively connect the third primary-winding to the first primary-winding in the voltage detection mode; and a sixth switching element configured to selectively connect the second primary-winding to the ground in the ground detection mode; and a controller configured to switch the overload protection device between the voltage detection mode and the ground detection mode.

Example 9 is the overload protection device of example(s) 8, wherein the first switching element and the second switching element are configured to transition the first voltage detecting circuit from a voltage detection mode to a ground detection mode.

Example 10 is the overload protection device of example(s) 8, wherein the first switching element and the second switching element change a configuration of the overload protection device from a delta configuration to a wye configuration.

Example 11 is the overload protection device of example(s) 8, wherein at least one of the first switching element and the second switching element is a mechanical switch.

Example 12 is the overload protection device of example(s) 8, wherein at least one of the first switching element and the second switching element is electrical switch.

Example 13 is the overload protection device of example(s) 8, wherein the controller is configured to compare the first signal strength, the second signal strength, and the third signal strength to determine a grounded condition.

Example 14 is the overload protection device of example(s) 13, wherein the controller is one of a programmable logic controller, a computer, or a dedicated microcontroller device.

Example 15 is a method for detecting a location of a grounded condition in an ungrounded electrical system, the method comprising: measuring a difference from a tie point of the ungrounded electrical system and a ground point to determine if a grounded condition exists; if the grounded condition exists, for each phase of electric current in the ungrounded electrical system: measuring a first signal at a first overload protection device; measuring a second signal at a second overload protection device; measuring a third signal at a third overload protection device; comparing at least one of the first signal, the second signal, and the third signal to a stored threshold value; and determining a location of the grounded condition based at least in part on the comparing the at least one of the first signal, the second signal, and the third signal to the stored threshold value; and displaying the location of the grounded condition on a display.

Example 16 is the method of example(s) 15, further comprising activating relays in each of the first overload protection device, the second overload protection device, and the third overload protection device to change a configuration of the ungrounded electrical system from a delta configuration to a wye configuration.

Example 17 is the method of example(s) 16, further comprising activating the relays in each of the first overload protection device, the second overload protection device, and the third overload protection device to change the configuration of the ungrounded electrical system from the wye configuration to the delta configuration.

Example 18 is the method of example(s) 15, wherein the location of the grounded condition is determined based at least in part on a length and an impedance of electrical circuit wiring of the ungrounded electrical system.

Example 19 is the method of example(s) 15, further comprising filtering the first signal at least one of the first overload protection device, the second signal at the second overload protection device, and the third overload protection device.

Example 20 is the method of example(s) 15, wherein at least one of the first signal, the second signal, and the third signal are measured in volts.

Example 21 is a method for detecting a location of a grounded condition in an ungrounded electrical system, the method comprising: measuring a difference from a tie point of the ungrounded electrical system and a ground point to determine if a grounded condition exists; if the grounded condition exists, for each phase of electric current in the ungrounded electrical system: measuring a first signal at a first overload protection device; measuring a second signal at a second overload protection device; measuring a third signal at a third overload protection device; comparing the first signal, the second signal, and the third signal; and determining a location of the grounded condition based at least in part on the comparing the first signal, the second signal, and the third signal; and displaying the location of the grounded condition on a display.

Example 22 is the method of example(s) 21, further comprising activating relays in each of the first overload protection device, the second overload protection device, and the third overload protection device to change a configuration of the ungrounded electrical system from a delta configuration to a wye configuration.

Example 23 is the method of example(s) 22, further comprising activating the relays in each of the first overload protection device, the second overload protection device, and the third overload protection device to change the configuration of the ungrounded electrical system from the wye configuration to the delta configuration.

Example 24 is the method of example(s) 21, wherein the location of the grounded condition is determined based at least in part a lowest voltage value of the first signal, the second signal, and the third signal.

Example 25 is the method of example(s) 21, further comprising filtering the first signal at least one of the first overload protection device, the second signal at the second overload protection device, and the third overload protection device.

Example 26 is the method of example(s) 21, wherein at least one of the first signal, the second signal, and the third signal are measured in volts.

Having described several example configurations, various modifications, alternative constructions, and equivalents may be used without departing from the spirit of the disclosure. For example, the above elements may be components of a larger system, wherein other rules may take precedence over or otherwise modify the application of the disclosure. Also, a number of steps may be undertaken before, during, or after the above elements are considered.

What is claimed is:

1. A method for detecting a location of a grounded condition in an ungrounded electrical system, the method comprising:
    measuring, using a ground detection circuit comprising at least a first overload protection device, a second overload protection device, and a third overload protection device, a difference from a tie point of the ungrounded electrical system and a ground point to determine if a grounded condition exists;
    if the grounded condition exists, for each phase of electric current in the ungrounded electrical system:
        measuring a first signal using a first detection circuit of the first overload protection device;
        measuring a second signal using a second detection circuit of the second overload protection device; and
        measuring a third signal using a third detection circuit of the third overload protection device;
    receiving, by a processor of a controller, the first signal, the second signal, and the third signal;
    comparing, by the processor, at least one of the first signal, the second signal, and the third signal to a stored threshold value;
    determining, by the processor, a location of the grounded condition based at least in part on the comparing the at least one of the first signal, the second signal, and the third signal to the stored threshold value; and
    displaying, by the processor, the location of the grounded condition on a display, wherein the location of the grounded condition is displayed within a digital representation associated with the ungrounded electrical system.

2. The method of claim 1, further comprising activating relays in each of the first overload protection device, the second overload protection device, and the third overload protection device to change a configuration of the ungrounded electrical system from a delta configuration to a wye configuration.

3. The method of claim 2, further comprising activating the relays in each of the first overload protection device, the second overload protection device, and the third overload protection device to change the configuration of the ungrounded electrical system from the wye configuration to the delta configuration.

4. The method of claim 1, wherein the location of the grounded condition is determined based at least in part on a length and an impedance of electrical circuit wiring of the ungrounded electrical system.

5. The method of claim 1, further comprising:
filtering the first signal at the first overload protection device;
filtering the second signal at the second overload protection device; and
filtering the third signal at the third overload protection device.

6. The method of claim 5, wherein:
filtering the first signal at the first overload protection device is performed using a first low-pass filter installed between the first overload protection device and the controller;
filtering the second signal at the second overload protection device is performed using a second low-pass filter installed between the second overload protection device and the controller; and
filtering the third signal at the third overload protection device is performed using a third low-pass filter installed between the third overload protection device and the controller.

7. The method of claim 1, wherein at least one of the first signal, the second signal, and the third signal are measured in volts.

8. The method of claim 1, wherein the first signal comprises a first electronic signal, the second signal comprises a second electronic signal, and the third signal comprises a third electronic signal.

9. The method of claim 1, wherein the first signal comprises a first analog signal, the second signal comprises a second analog signal, and the third signal comprises a third analog signal, and the method further comprises:
converting the first analog signal to a first digital signal;
converting the second analog signal to a second digital signal; and
converting the third analog signal to a third digital signal.

10. The method of claim 1, wherein the first signal comprises a first voltage signal, the second signal comprises a second voltage signal, and the third signal comprises a third voltage signal.

11. The method of claim 10, wherein determining the location of the grounded condition further comprises:
determining a lowest voltage based on the first voltage signal, the second voltage signal, and the third voltage signal; and
identifying the location of the grounded condition based on the lowest voltage.

12. The method of claim 1, wherein the digital representation comprises a map.

13. The method of claim 1, wherein the location of the grounded condition is displayed as a pinpoint location within the digital representation associated with the ungrounded electrical system.

14. The method of claim 1, wherein the location of the grounded condition is displayed as an area within the digital representation associated with the ungrounded electrical system.

15. The method of claim 1, wherein the location of the grounded condition is displayed as a distance between components of the ungrounded electrical system.

* * * * *